(12) United States Patent
Ikeda et al.

(10) Patent No.: US 8,111,442 B2
(45) Date of Patent: Feb. 7, 2012

(54) REFLECTION TYPE DISPLAY APPARATUS

(75) Inventors: Hajime Ikeda, Yokohama (JP); Makoto Higashikawa, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/969,649

(22) Filed: Dec. 16, 2010

(65) Prior Publication Data
US 2011/0085228 A1   Apr. 14, 2011

Related U.S. Application Data

(63) Continuation of application No. 12/500,288, filed on Jul. 9, 2009, now Pat. No. 7,876,490.

(30) Foreign Application Priority Data

Jul. 24, 2008  (JP) .................................. 2008-191049
Aug. 19, 2008  (JP) .................................. 2008-210527

(51) Int. Cl.
*G02F 1/03*     (2006.01)
*G09G 3/38*     (2006.01)
*B28B 7/36*     (2006.01)

(52) U.S. Cl. ......... 359/245; 359/254; 345/105; 249/113

(58) Field of Classification Search .......... 359/245–250, 359/237, 265–275, 259, 315–318, 253–254; 345/49, 105, 107; 250/70; 438/929; 249/24, 249/113; 430/31–32; 349/33
See application file for complete search history.

(56) References Cited

U.S. PATENT DOCUMENTS

| 6,839,158 | B2 * | 1/2005 | Albert et al. .................. 359/296 |
| 2004/0184137 | A1 * | 9/2004 | Kaneko et al. ................ 359/296 |
| 2006/0028707 | A1 | 2/2006 | Shinozaki et al. |
| 2006/0152438 | A1 | 7/2006 | Tanaka |
| 2009/0021472 | A1 * | 1/2009 | Ikeda ............................ 345/105 |
| 2010/0278561 | A1 * | 11/2010 | Kanda et al. .................. 399/168 |

FOREIGN PATENT DOCUMENTS

| JP | 11-101994 A | 4/1999 |
| JP | 2004-170850 A | 6/2004 |
| JP | 2005-092183 A | 4/2005 |

* cited by examiner

*Primary Examiner* — Dawayne Pinkney
(74) *Attorney, Agent, or Firm* — Fitzpatrick, Cella, Harper & Scinto

(57) ABSTRACT

A display apparatus using electroplating on an electrode for modulating light includes a layer formed on the electrode. The layer has an insulator with a gap therein, and conductive fine particles are dispersed in the gap.

16 Claims, 15 Drawing Sheets

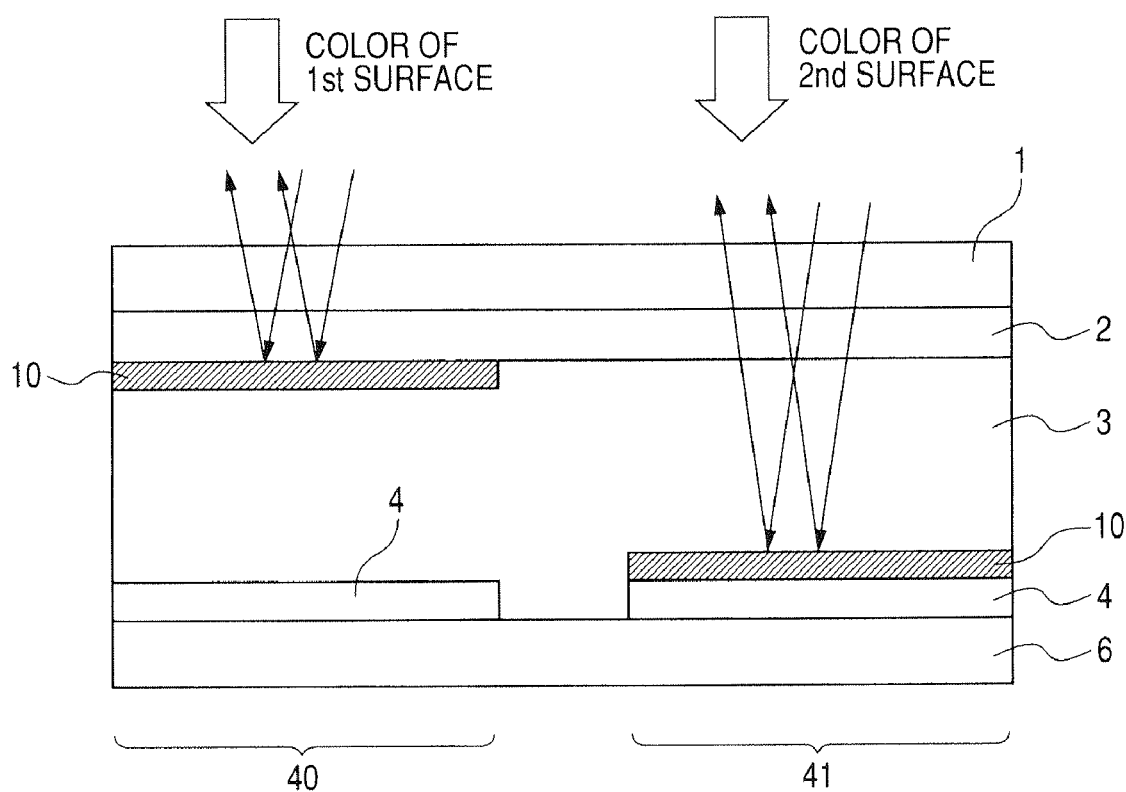

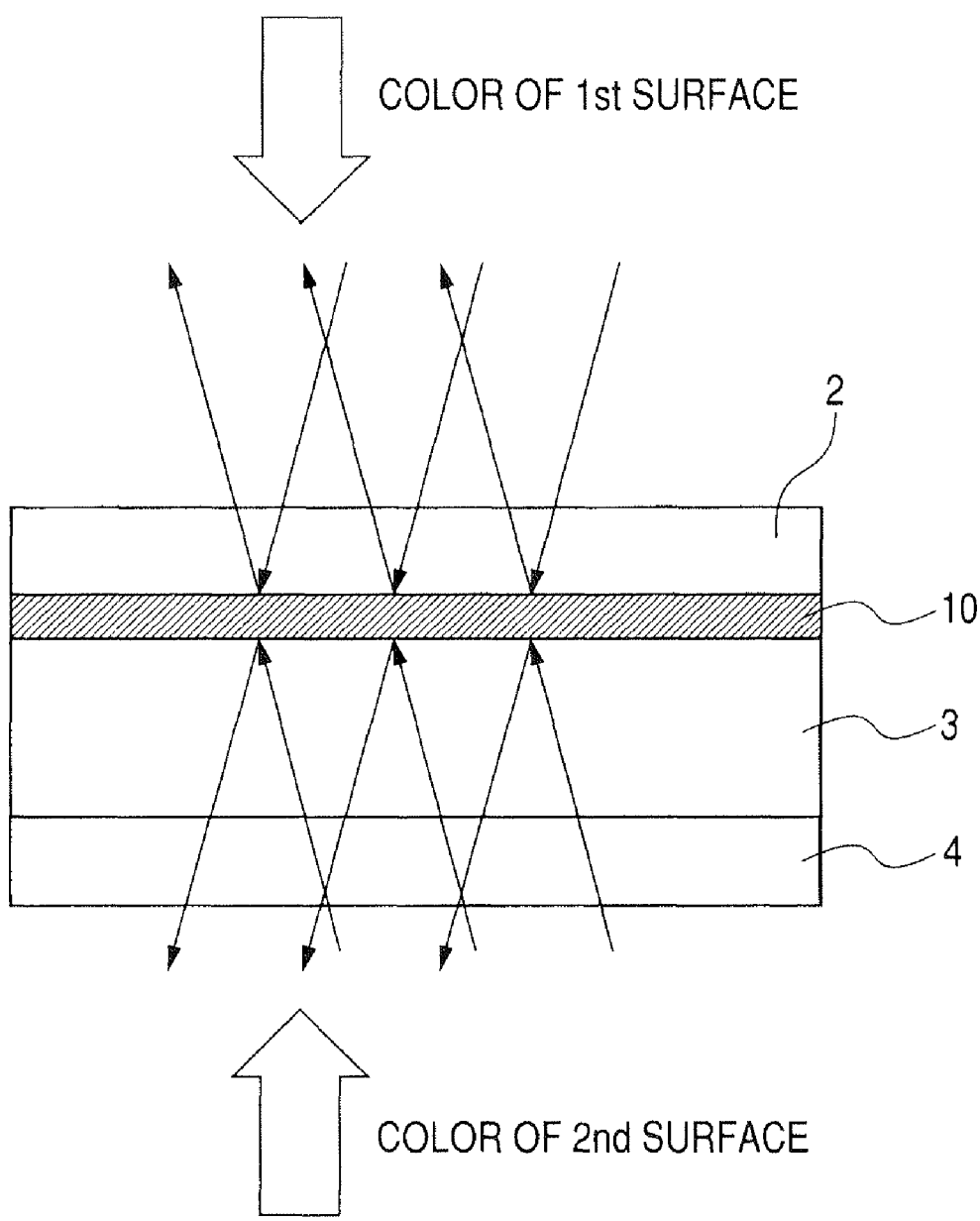

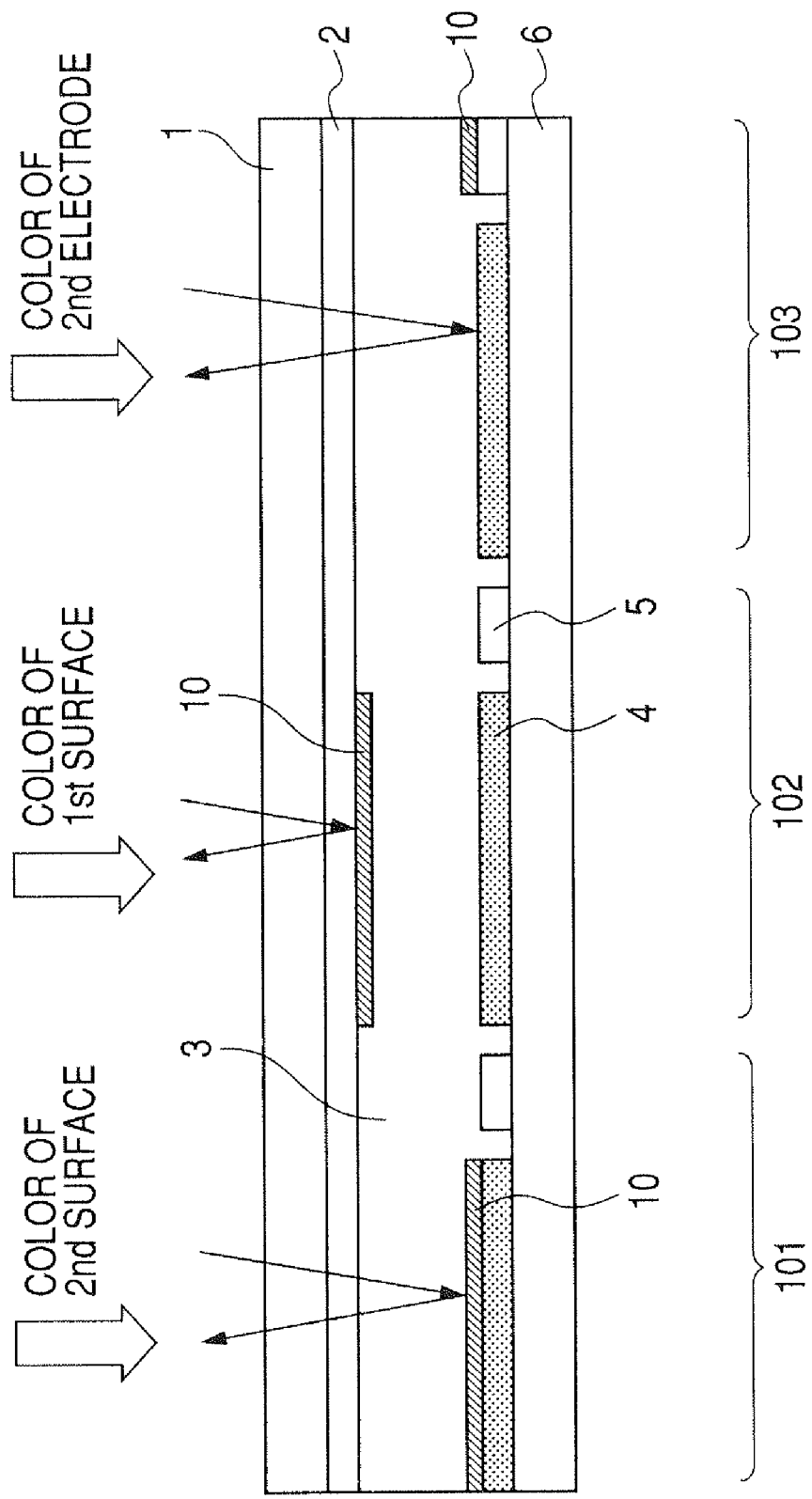

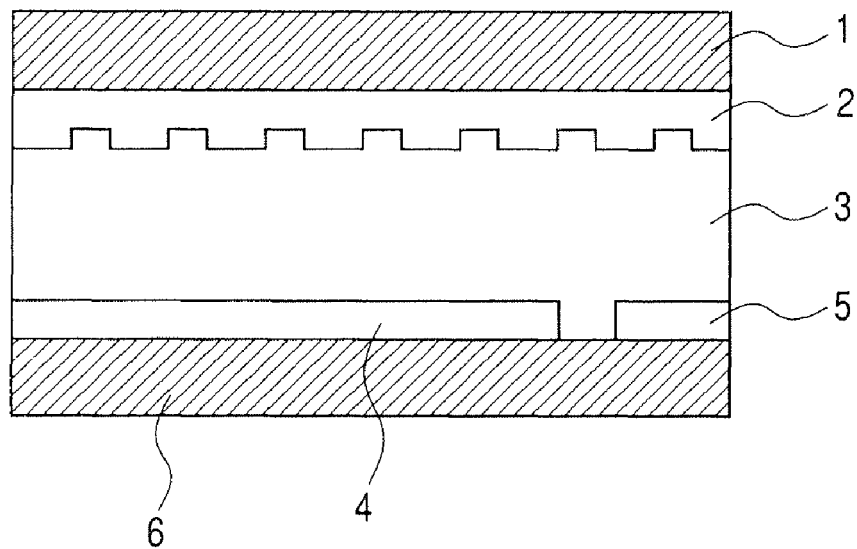
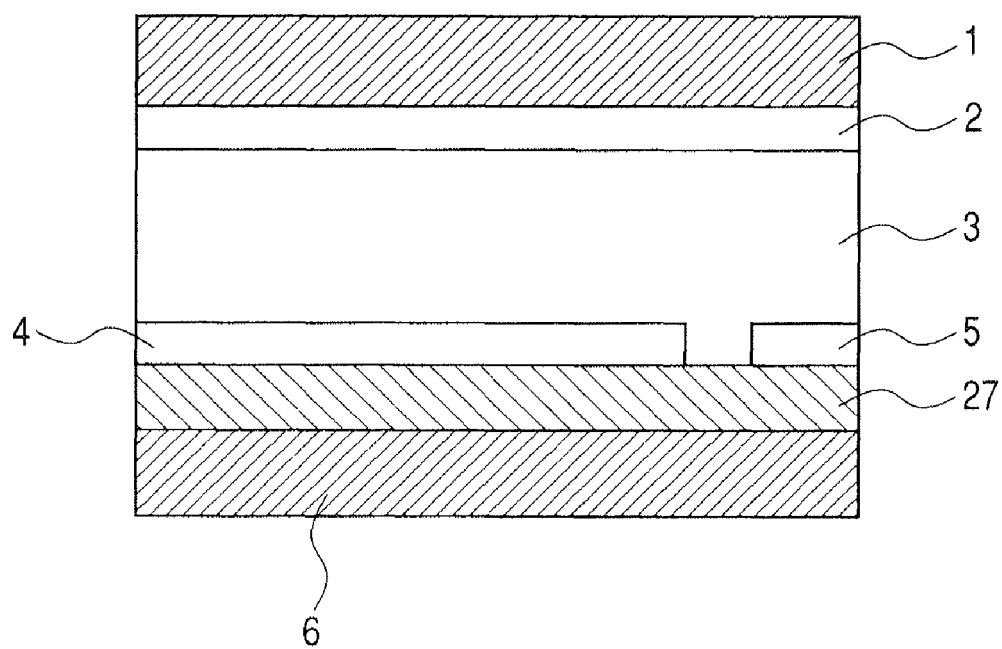

EMBODIMENT 1: SOLID LINE (○)
COMPARATIVE EXAMPLE 1: DOT AND BAR LINE (◇)
COMPARATIVE EXAMPLE 2: DOTTED LINE (△)

REFLECTION TYPE DISPLAY APPARATUS

This is a continuation of application Ser. No. 12/500,288, filed Jul. 9, 2009, now allowed.

BACKGROUND OF THE INVENTION

1. Field of the Invention

The present invention relates to a reflection type display apparatus and, more particularly, to a reflection type display apparatus which has an electrode that comes into contact with an electrolyte solution and in which an electroplating film is formed on the electrode and an electroplating is used for modulating light.

2. Description of the Related Art

As a display apparatus in which visibility is high and electric power consumption is small, electronic paper is vigorously being developed. An example in which a color filter is combined with a display apparatus using an electroplating has been disclosed in the Official Gazette of Japanese Patent Application Laid-Open No. H11-101994. According to the Official Gazette of Japanese Patent Application Laid-Open No. H11-101994, the display apparatus has a structure in which a silver salt solution is arranged between a working electrode and a counter electrode, a color filter is arranged on a light incident side of the working electrode (the side opposite to the side of the working electrode where the silver salt solution is arranged), and a white background plate is arranged on the counter electrode (on the side of the counter electrode where the silver salt solution is arranged). In the case of allowing silver to be deposited in the working electrode, the light which has entered through the color filter is absorbed by deposited silver. On the contrary, if silver is not deposited in the working electrode, the light which has entered through the color filter passes through the working electrode, is reflected by the white background plate, and passes through the working electrode and the color filter, thereby performing a color display.

SUMMARY OF THE INVENTION

According to the Official Gazette of Japanese Patent Application Laid-Open No. H11-101994, the display apparatus has a structure in which the incident light passes through the color filter before it is reflected by a reflection layer. Pixels corresponding to three primary colors are necessary to display a white color by such a structure. Each pixel reflects only a monochromatic color and, in the incident light, color components which are not reflected are absorbed by a color filter of each pixel. For example, in the pixel which reflects a red color, blue and green components are absorbed. In the pixel which reflects a blue color, red and green components are absorbed. In the pixel which reflects a green color, blue and red components are absorbed. Therefore, at the time of the white display, the red component is absorbed in the blue and green pixels, the blue component is absorbed in the red and green pixels, and the green component is absorbed in the red and blue pixels. In other words, an area adapted to reflect the red color is equal to 1/3 of the whole area of the display apparatus. This is true of green and blue. Since the light of each color is reflected only by the area of 1/3 as mentioned above, the whole reflectance at the time of the white display is equal to only 1/3 even when considering only an effective reflection area ratio of each color. It is, therefore, demanded to improve the reflectance.

It is an object of the invention to provide a reflection type display apparatus which can perform a dichroic display by using an electroplating film and, more particularly, to provide a reflection type display apparatus in which a reflectance at the time of a white display is high and a good black display can be performed.

Another object of the invention is to provide a reflection type display apparatus which can perform a white display at a high reflectance and can be applied to a better color display.

According to the invention, there is provided a reflection type display apparatus using an electroplating for modulating light, comprising: a first electrode; a second electrode; and an electrolyte solution arranged between the first and second electrodes, wherein the electroplating is formed from the electrolyte solution onto one of the first and second electrodes by setting a direction of current flowing between the first and second electrodes, a first surface of the electroplating formed on the first electrode such that the electroplating contacts the first electrode through the first surface is different in at least one of a light reflectance and a light absorptance from a second surface of the electroplating formed on the second electrode such that the electroplating does not contact the second electrode through the second surface, and a displaying is performed by a reflection light from the first surface in case that the electroplating is formed on the first electrode, while a displaying is performed by a reflection light from the second surface in case that the electroplating is formed on the second electrode.

According to the invention, the reflection type display apparatus which can perform the dichroic display by using the electroplating film and, more particularly, in which the reflectance at the time of the white display is high and the good black display can be performed can be obtained.

According to the invention, the reflection type display apparatus which can perform the white display at the high reflectance and can perform the color display can be obtained.

Further features of the present invention will become apparent from the following description of exemplary embodiments with reference to the attached drawings.

BRIEF DESCRIPTION OF THE DRAWINGS

FIG. 1 is a cross sectional view illustrating a schematic construction of the first embodiment of a reflection type display apparatus of the invention.

FIG. 2 is a schematic cross sectional view illustrating another displaying method of the reflection type display apparatus of the first embodiment.

FIG. 3 is a cross sectional view illustrating a schematic construction of the second embodiment of a reflection type display apparatus of the invention.

FIG. 7 is a cross sectional view of a pixel of a reflection type display apparatus of the fifth embodiment of the invention.

FIG. 8 is a cross sectional view of a pixel of a reflection type display apparatus of the sixth embodiment of the invention.

DESCRIPTION OF THE EMBODIMENTS

Figure 4A:
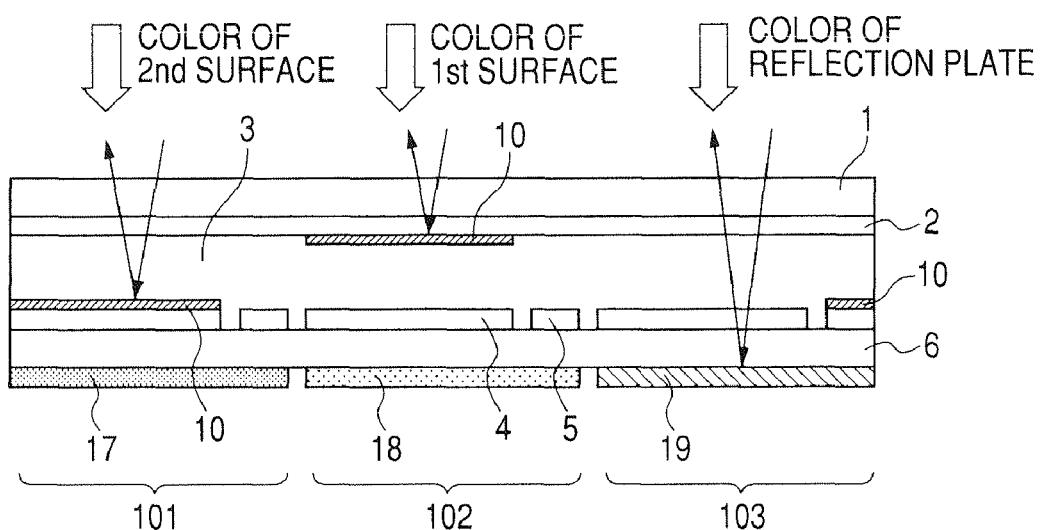
FIG. 4A is a cross sectional view illustrating a schematic construction of the third embodiment of a reflection type display apparatus of the invention.

Exemplary embodiments of the invention will be described in detail hereinbelow with reference to the drawings.

First Embodiment

FIG. 1 is a cross sectional view illustrating a schematic construction of the first embodiment of a reflection type display apparatus of the invention. A pixel 40 in FIG. 1 illustrates a pixel in the case where an electroplating film 10 is formed on a first electrode 2. A pixel 41 in FIG. 1 illustrates a pixel in the case where the electroplating film 10 is formed on a second electrode 4.

In FIG. 1, the first electrode 2 having a light transmitting property is formed on a substrate 1 having a light transmitting property (serving as a first substrate) and the second electrode 4 having a light transmitting property is formed on a substrate 6 having a light transmitting property (serving as a second substrate). The first electrode 2 and the second electrode 4 are arranged so as to face each other through an electrolyte solution 3. Although the second electrode 4 may have the light transmitting property, it may be made of a metal which does not have the light transmitting property. The substrate 6 provided with the second electrode 4 may not have the light transmitting property. The electrolyte solution 3 contains two or more kinds of metal elements serving as metal ions. It is sufficient that the light transmitting electrode substantially has the light transmitting property. It is not always necessary to form the electrode having the light transmitting property by a transparent electrode such as an ITO or the like but it can be formed by a thin metal film or a mesh structure or comb-tooth structure of a metal (this is true of other embodiments, which will be described hereinafter), can be also used.

When the first electrode 2 is assumed to be a cathode, the second electrode 4 is assumed to be an anode, and a current is supplied to those electrodes, the metal ions contained in the electrolyte solution 3 are reduction-deposited on the surface of the first electrode 2. As illustrated in the pixel 40, the metal is electroplated onto the first electrode 2, so that the electroplating film 10 is formed. In this instance, the color of the deposited electroplating film is influenced by compositions of the electrolyte solution 3. For example, when the electrolyte solution 3 contains silver and copper, an interface (the first surface of the electroplating film) between the first electrode 2 and the electroplating film 10 becomes a non-colored mirror surface and reflects the incident light. Therefore, when seen from the first electrode 2 side, the white color as a first color is observed.

On the other hand, when the second electrode 4 is assumed to be the cathode, the first electrode 2 is assumed to be the anode, and a current is supplied to those electrodes, the metal ions contained in the electrolyte solution 3 are reduction-deposited on the surface of the second electrode 4. As illustrated in the pixel 41, the metal is electroplated onto the second electrode 4, so that the electroplating film 10 is formed. When the electroplating film 10 is seen from the first electrode 2 side, the surface of the electroplating film 10 which is not come into contact with the second electrode 4 (the second surface of the electroplating film) is observed. In this instance, the color of the deposited electroplating film is influenced by the compositions of the electrolyte solution 3. For example, when the electrolyte solution 3 contains silver and copper, the surface of the electroplating film has a rough concave/convex shape and absorbs the incident light. Therefore, the black color as a second color is observed.

In order to form the electroplating film in which the colors of the obverse and reverse surfaces differ, like an electrolyte solution 3 containing silver and copper as shown as an example in the embodiment, the electrolyte solution contains the two or more kinds of metal elements serving as metal ions. As two or more kinds of metal elements, the electrolyte solution contains at least: a first metal element serving as an electroplating seed; and a second metal element whose oxidation-reduction potential is close to that of the first metal element. In the embodiment, silver is used as a first metal element and copper is used as a second metal element.

A reason why the oxidation-reduction potential of the second metal element is close to that of the first metal element will be described hereinbelow. It is assumed that as main components, the electrolyte solution contains: a first substance whose oxidation-reduction potential is higher than that of the first metal element; and a second substance which is a main component in the solution and whose oxidation-reduction potential is lower than that of the first metal element. For example, when a dimethylformamide solution is used as an electrolyte solution, the first substance corresponds to bromine and the second substance corresponds to hydrogen. Assuming that the oxidation-reduction potentials of the first substance and the second substance are set to the first electric potential and the second electric potential, respectively, the oxidation-reduction potential of the second metal element in the electrolyte solution is lower than the first electric potential and is higher than the second electric potential. According to the foregoing example, when the oxidation-reduction potential of silver serving as a first metal element is assumed to be a reference (0V), the oxidation-reduction potential (the first electric potential) of bromine (the first substance) is higher (+0.2V) than the oxidation-reduction potential of silver and the oxidation-reduction potential (the second electric potential) of hydrogen (the second substance) is lower (−0.8V) than the oxidation-reduction potential of silver. The oxidation-reduction potential of copper serving as a second metal element is located between the first electric potential and the second electric potential (−0.3V). The second metal element in such a state is defined as a second metal element in which "oxidation-reduction potential is close to that of the first metal element".

Ordinarily, in the electroplating which is used for light modulation, the electrolyte solution is designed so that oxidation/reduction of the unexpected substances does not occur in a range where the electric potential of the electrode changes. That is, the substance whose oxidation-reduction potential is close is not contained in the electrolyte solution so that the substances other than the metal to be electroplated are not reduced on the electrode. This is because if a plurality of metals are oxidized/reduced on the same electrode, a turbulence occurs and the clean electroplating film is not deposited. However, in the embodiment, the two kinds of metal elements having the oxidation-reduction potentials within the range where the electric potential of the electrode changes are purposely contained in the electrolyte solution, thereby intentionally causing the turbulence. Due to the turbulence, the deposited electroplating film grows into the large concave/convex shape, so that the colors of the obverse and reverse surfaces of the electroplating film differ largely.

In the pixel 40, in a state where the electroplating film has been formed on the first electrode 2, when the second electrode 4 is assumed to be the cathode, the first electrode 2 is assumed to be the anode, and a current is supplied to those electrodes, the electroplating film is formed onto the second electrode 4 and the electroplating film formed on the first electrode 2 is dissolved. Therefore, by switching the current flowing direction in the first electrode 2 and the current flowing direction in the second electrode 4, the electroplating film can be formed onto an arbitrary one of the first electrode 2 and the second electrode 4 in the same pixel.

By constructing the reflection type display apparatus by using such a principle, the monochromatic (black and white) dichroic display can be switched. By controlling a thickness of electroplating film, a gradation display can be also performed.

In the reflection type display apparatus of the embodiment, by allowing the second electrode 4 to have the light transmitting property and by allowing the substrate 6 to have the light transmitting property, the dichroic display in which the colors of the obverse and reverse surfaces differ can be also performed as illustrated in FIG. 2. That is, when the electroplating film 10 is formed onto the first electrode 2, as illustrated in FIG. 2, for example, in the case where the electrolyte solution 3 contains silver and copper, when the electroplating film 10 is seen from the first electrode 2 side, the white color as a first color is observed. When it is seen from the second electrode 4 side, the black color as a second color is observed. In this manner, the dichroic display in which the colors of the obverse and reverse surfaces differ can be also performed. When the electroplating film 10 is formed onto the second electrode 4, in the case where the electroplating film 10 is seen from the first electrode 2 side, the black color as a second color is observed. When it is seen from the second electrode 4 side, the white color as a first color is observed. In this manner, the dichroic display in which the colors of the obverse and reverse surfaces differ can be performed. The substrates 1 and 6 are omitted for simplicity of description in FIG. 2.

Either the first electrode 2 or the second electrode 4 may be formed by a metal wire such as a platinum wire. In this case, since the platinum wire is hardly observed, the reflection type display apparatus as illustrated in FIG. 2 can be formed.

The dichroic display in which the colors of the obverse and reverse surfaces differ and which is performed by using the electroplating film formed on the first electrode 2 and the dichroic display in which the colors of the obverse and reverse surfaces differ and which is performed by using the electroplating film formed on the second electrode 4 as described above can be combined. By using such a combination, a reflection type display apparatus in which the dichroic display can be performed with respect to each of the obverse and reverse surfaces can be also realized.

Second Embodiment

FIG. 3 is a cross sectional view illustrating a schematic construction of the second embodiment of a reflection type display apparatus of the invention. In FIG. 3, three pixels 101, 102, and 103 are illustrated. The reflection type display apparatus is constructed by laminating: the first substrate 1 which protects the surface; the first electrode 2; the colored second electrode 4 which faces the first electrode 2 through the electrolyte solution 3; a third electrode 5 which is come into contact with the same electrolyte solution as that of the first electrode 2 and the second electrode 4; and the second substrate 6. The first electrode 2 and the first substrate 1 have the light transmitting property. The electrolyte solution 3 contains two or more kinds of metal ions. An area of the third electrode 5 is smaller than an area of the second electrode 4. The second substrate 6 may or may not have the light transmitting property. FIG. 3 illustrates the case where in the pixel 101, the electroplating film 10 is formed on the second electrode 4, in the pixel 102, the electroplating film 10 is formed on the first electrode 2, and in the pixel 103, the electroplating film is formed on the third electrode 5, respectively.

When the first electrode 2 is assumed to be the cathode, the second electrode 4 and the third electrode 5 are assumed to be the anodes, and a current is supplied to those electrodes, the metal ions contained in the electrolyte solution 3 are reduction-deposited on the surface of the first electrode 2 as illustrated in the pixel 102, so that the metal is electroplated. In this instance, the color of the deposited metal film is influenced by the compositions of the electrolyte solution 3. For example, when the electroplating liquid contains silver and copper, the interface (the first surface of the electroplating film) between the first electrode 2 and the electroplating film becomes a non-colored mirror surface and reflects the incident light. Therefore, when seen from the first substrate 1 side, the white color as a first color is observed.

On the other hand, when the second electrode 4 is assumed to be the cathode, the first electrode 2 and the third electrode 5 are assumed to be the anodes, and a current is supplied to those electrodes, the electroplating film is electroplated onto the surface of the second electrode 4 as illustrated in the pixel 101. At this time, when seen from the substrate 1 side, the obverse surface of the electroplating film which is not come into contact with the electrode (the second surface of the electroplating film) is observed from the surface. However, the surface has a rough concave/convex shape and absorbs the incident light. Therefore, the black color as a second color is observed.

When the third electrode 5 is assumed to be the cathode, the first electrode 2 and the second electrode 4 are assumed to be the anodes, and a current is supplied to those electrodes, the metal ions contained in the electrolyte solution 3 are reduction-deposited on the surface of the third electrode 5 as illustrated in the pixel 103, and the metal is electroplated. At this time, since all of the metals deposited on the surfaces of the first electrode 2 and the second electrode 4 are also dissolved, the color of the second electrode 4 is observed from the obverse surface through the first electrode 2 having the light transmitting property.

The second electrode 4 may use the color of the material itself or may use a selective reflection due to the laminated structure. For example, when the second electrode 4 is formed by a laminated structure of TiN and AlCu, the reflection color can be adjusted by an interference depending on a film thickness of TiN.

Even if the second electrode 4 is formed by a material having a light transmitting property and a colored substance is arranged on the supporting substrate 6, a similar effect is obtained.

If the reflection type display apparatus is formed by using such a principle, a trichromatic display can be switched.

With respect to the electroplating film which is formed/extinguished on the surface of the first electrode 2 and the electroplating film which is formed/extinguished on the surface of the second electrode 4, the transmitting ratio or reflectance of the light can be adjusted by adjusting a thickness of electroplating film.

Third Embodiment

FIG. 4A is a cross sectional view illustrating a schematic construction of the third embodiment of a reflection type display apparatus of the invention. The embodiment relates to the apparatus for performing a full-color display by arranging a plurality of pixels in a matrix form. A construction of the third embodiment differs from the construction of the second embodiment with respect to a point that the second electrode 4 and the substrate 6 have the light transmitting property and reflection plates 17, 18, and 19 in which wavelength ranges of the light which is reflected are red, blue, and green are arranged below the second electrode 4 and the third electrode 5, respectively. In the pixels 101 and 102, a display similar to that FIG. 3 is performed. However, in the pixel 103, the second electrode 4 and the substrate 6 transmit the light and the light is reflected by the reflection plate 19, so that the color of the reflection plate 19 can be seen.

Although the reflection plate is used as a reflector in the embodiment, the reflector can be formed by forming a reflecting layer adapted to reflect the light of a specific color onto the substrate 6 pixel by pixel by printing or the like. The reflector may be formed by forming a color filter onto the substrate 6 and arranging a reflection plate onto the color filter. Although FIG. 4A illustrates an example in which the electrodes 4 and 5 are formed on one surface of the substrate 6 and the reflection plate as a reflector is formed onto the opposite surface, even if the reflector such as a reflection plate or the like comes into contact with the electrolyte solution, there is no problem. The reflector may be provided between the substrate 6 and the electrodes 4 and 5 so long as the electrodes 4 and 5 can be formed on the reflector.

Figure 4B:
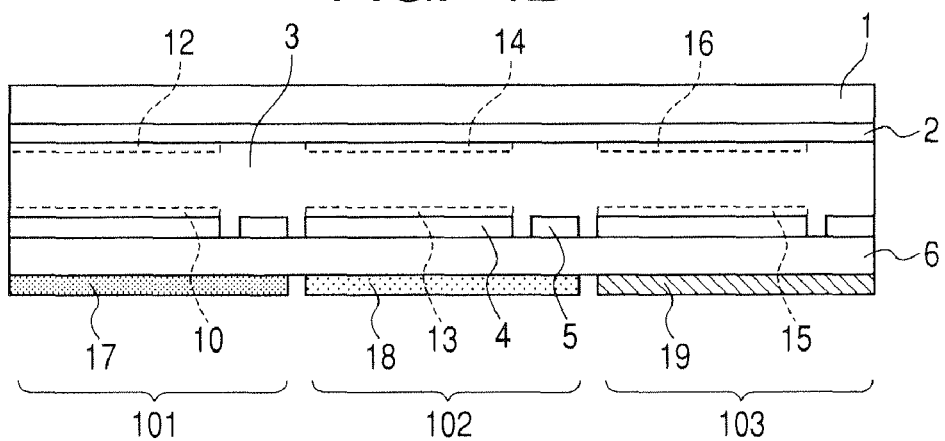
FIG. 4B is a cross sectional view for describing an operation principle of a full-color display in the third embodiment of the reflection type display apparatus of the invention.
Figure 4C:
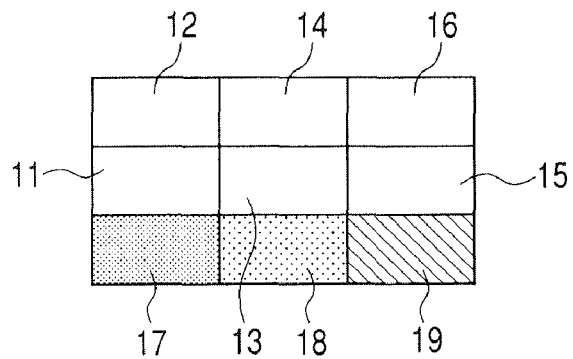
FIG. 4C is a constructional diagram illustrating a conceptual construction of the full-color display in FIG. 4B.

A principle of performing the full-color display will now be described hereinbelow with reference to FIGS. 4B and 4C. FIG. 4B is a cross sectional view for describing an operation principle of the full-color display in the third embodiment of the reflection type display apparatus of the invention. FIG. 4C is a constructional diagram illustrating a conceptual construction of the full-color display in FIG. 4B. In FIG. 4B, the electroplating films which are formed on the surfaces of the second electrodes 4 of the pixels 101, 102, and 103 are constructed as black films and are illustrated as first light modulating layers 11, 13, and 15 for adjusting light absorptances in a range from 0 to 100%. When the light absorptance is equal to 0, this means a state where no electroplating film is formed or the thickness of electroplating film is so thin that the light absorption is not perceived. The electroplating films which are formed on the surfaces of the first electrodes 2 of the pixels 101, 102, and 103 are constructed as white films and are illustrated as second light modulating layers 12, 14, and 16 for adjusting light reflectances in a range from 0 to 100%. When the light reflectance is equal to 0, this means a state where no electroplating film is formed or the thickness of electroplating film is so thin that the light reflection is not perceived.

In the reflection type display apparatus of the embodiment, it is not always necessary that the absorptance and the reflectance can be controlled in the whole range from 0 to 100%, but can be also controlled in a range from about 30 to 70%. Although the expression such as 0%, 100%, or the like is conceptually used hereinbelow, those values are not essential requirements of the embodiment.

Now, assuming that a transmitting ratio, a reflectance, and an absorptance of each of the first light modulating layers 11, 13, and 15 are equal to $T_1$, $R_1$, and $A_1$, respectively, and a transmitting ratio, a reflectance, and an absorptance of each of the second light modulating layers 12, 14, and 16 are equal to $T_2$, $R_2$, and $A_2$, respectively, the following equations (1) and (2) are satisfied.

$$T_1 = 1 - A_1 - R_1 \quad (1)$$

$$T_2 = 1 - A_2 - R_2 \quad (2)$$

Since the first light modulating layer is constructed by the black electroplating films, it may be considered that the reflectance $R_1$ is equal to 0. Since the second light modulating layer is constructed by the white electroplating films, it may be considered that the absorptance $A_2$ is equal to 0. Therefore, the equations (1) and (2) are approximated by the following equations (3) and (4).

$$T_1 = 1 - A_1 \quad (3)$$

$$T_2 = 1 - R_2 \quad (4)$$

Figure 5:
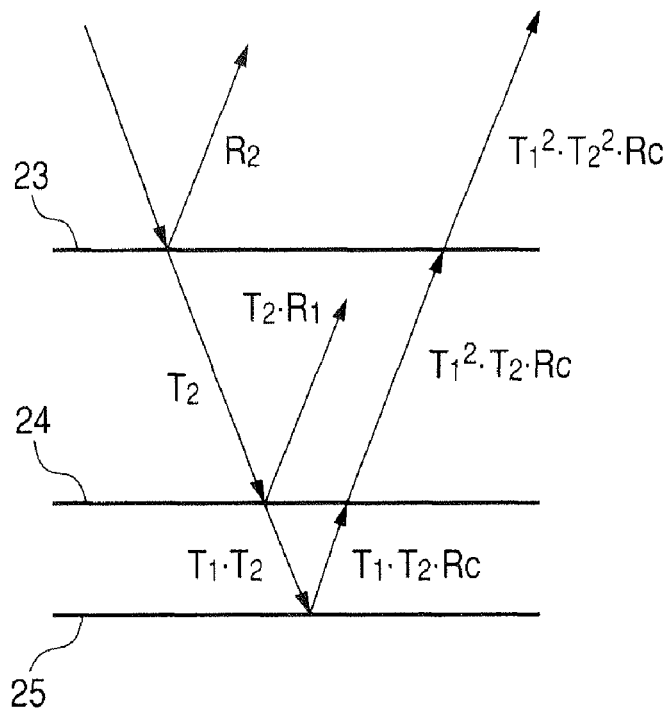
FIG. 5 is a schematic cross sectional view illustrating reflection, transmission, and absorption of light which entered a pixel.

FIG. 5 is a schematic cross sectional view illustrating the reflection, transmission, and absorption of the light which entered the pixel. A light intensity of incident light is assumed to be 1 and a reflectance at the reflection plate is assumed to be $R_c$. The light having a light intensity of $R_2$ in the incident light is reflected by a surface 23 of the second light modulating layer and the light having a light intensity of $T_2$ passes through the second light modulating layer. With respect to the transmission light having the light intensity of $T_2$, the light having a light intensity which is $R_1$ times as large as the light intensity of $T_2$ is reflected by a surface 24 of the first light modulating layer and the light having a light intensity which is $T_1$ times as large as the light intensity of $T_2$ passes through the first light modulating layer. With respect to the light of $T_1 \cdot T_2$ which has passed through the first light modulating layer, the light having a light intensity which is $R_c$ times as large as the light intensity of $T_1 \cdot T_2$, that is, the light having the light intensity which is $T_1 \cdot T_2 \cdot R_c$ times as large as the light intensity of the light which entered from the most-obverse surface is reflected by the reflection plate and enters the first light modulating layer again. The light having a light intensity which is $T_1$ times as large as the light intensity of the incident light, that is, the light having the light intensity which is $T_1^2 \cdot T_2 \cdot R_c$ times as large as the light intensity of the light which entered from the most-obverse surface passes through the surface 24 of the first light modulating layer. The transmission light passes through the surface 23 of the second light modulating layer again and the light having a light intensity which is $T_2$ times as large as the light intensity of the incident light passes through there. Therefore, the light intensity of the transmission light is $T_1^2 \cdot T_2^2 \cdot R_c$ times as large as the light intensity of the light which entered from the most-obverse surface. If the light having the light intensity of $R_2$ reflected by the surface 23 of the second light modulating layer is also added, the multiple reflection is ignored and the light intensity of the reflection light is $(R_2+T_1^2 \cdot T_2^2 \cdot R_c)$ times as large as the light intensity of the incident light. Therefore, a reflection light intensity I is obtained by the following equation (5).

$$I = R_2 + T_1^2 \cdot T_2^2 \cdot R_c = R_2 + (1-A_1)^2 \cdot (1-R_2)^2 \cdot R_c \quad (5)$$

The reason why the color display, the black display, and the white display in which the reflectance is high can be performed by the above display apparatus will be sequentially described hereinbelow.

First, in the case of displaying a specific color, for example, red, both of the first light modulating layer and the second light modulating layer 12 on the reflection plate 17 for reflecting the wavelength range of red are set into the transmitting state. That is, they are set into the state of $T_1=T_2=1$ and the first light modulating layers 13 and 15 on the reflection plates 18 and 19 for reflecting the wavelength ranges of blue and green are set into the absorbing state. Although the second light modulating layers 14 and 16 may be set into either the reflecting state or the transmitting state, they are set into the transmitting state here. It is assumed that $R_c=0.33$ and the states of the light modulating layers are summarized to the following TABLE 1. TABLE 1 is a table in which with respect to each of the pixels having the reflection plates 17, 18, and 19 of red, green, and blue, the absorptance of the first light modulating layer, the reflectance of the second light modulating layer, and the reflection light intensity I which is calculated by the equation (5) are summarized. Although the expressions such as "reflectance is equal to 1", "absorptance is equal to 1", "reflectance is equal to 0", "absorptance is equal to 0", and the like are conceptually used here, it corresponds to the ideal state and the perfect reflection and the perfect absorption are not necessarily indispensable. This is true of the following expressions.

TABLE 1

States of light modulating layers at the time of the red display

| Reflectance $R_2$ | 0 | 0 | 0 |
| --- | --- | --- | --- |
| Absorptance $A_1$ | 0 | 1 | 1 |
| Reflection light intensity I | 0.33 | 0 | 0 |
| Color of reflection plate | Red (reflection plate 17) | Green (reflection plate 18) | Blue (reflection plate 19) |

The incident light passes through the light modulating layers 11 and 12 over the reflection plate 17 for reflecting the wavelength range of red and the red light is reflected by the reflection plate 17. Since the light modulating layers 13 and 15 absorb the incident light and do not reflect and transmit the incident light, the pixels of blue and green become black. Thus, only the red light is reflected and the red display is performed.

Similarly, the states of the light modulating layers in the case of displaying white are summarized to the following TABLE 2. At the time of the white display, since the whole incident light is reflected by the light modulating layers, the white display is performed. That is, according to the embodiment, at the time of the white display, the incident light is not absorbed by the color filters or the like but the whole incident light is reflected. Therefore, the white display of the high reflectance can be realized. Similarly, a construction in the case of expressing black is summarized to the following TABLE 3.

TABLE 2

States of light modulating layers at the time of the white display

| Reflectance $R_2$ | 1 | 1 | 1 |
| --- | --- | --- | --- |
| Absorptance $A_1$ | 0 | 0 | 0 |
| Reflection light intensity I | 1 | 1 | 1 |
| Color of reflection plate | Red (reflection plate 17) | Green (reflection plate 18) | Blue (reflection plate 19) |

TABLE 3

States of light modulating layers at the time of the black display

| Reflectance $R_2$ | 0 | 0 | 0 |
| --- | --- | --- | --- |
| Absorptance $A_1$ | 1 | 1 | 1 |
| Reflection light intensity I | 0 | 0 | 0 |
| Color of reflection plate | Red (reflection plate 17) | Green (reflection plate 18) | Blue (reflection plate 19) |

Similarly, the gradation display from white to black can be also realized. The operation to express white of a reflectance n (0<n<1), that is, gray can be performed by adjusting the foregoing factors as illustrated in the following TABLE 4.

TABLE 4

States of light modulating layers at the time of the white display of the reflectance n to the black display

| Reflectance $R_2$ | n | n | n |
| --- | --- | --- | --- |
| Absorptance $A_1$ | 1 | 1 | 1 |
| Reflection light intensity I | n | n | n |
| Color of reflection plate | Red (reflection plate 17) | Green (reflection plate 18) | Blue (reflection plate 19) |

By the combination as mentioned above, the color display can be performed and the display of the high reflectance at the time of the white display can be realized. The above combination is an example and the invention is not always limited to such a combination but a further variety of combinations can be made.

The reflection type display apparatus of each embodiment described above can be realized as either a display apparatus of a passive matrix driving type or a display apparatus of an active matrix driving type. A spacer is provided between the substrates 1 and 6 in order to keep an interval between the substrates constant. The spacer is formed in an arbitrary shape such as cylindrical shape, spherical shape, or quadrangular prism shape.

Although the reflection type display apparatus of the passive matrix driving type and the reflection type display apparatus of the active matrix driving type will be described hereinbelow with respect to the construction of the second embodiment illustrated in FIG. 3 as an example, a similar construction can be also used in the first and third embodiments. The first embodiment uses the construction in which the third electrode 5 is eliminated.

Figure 9:
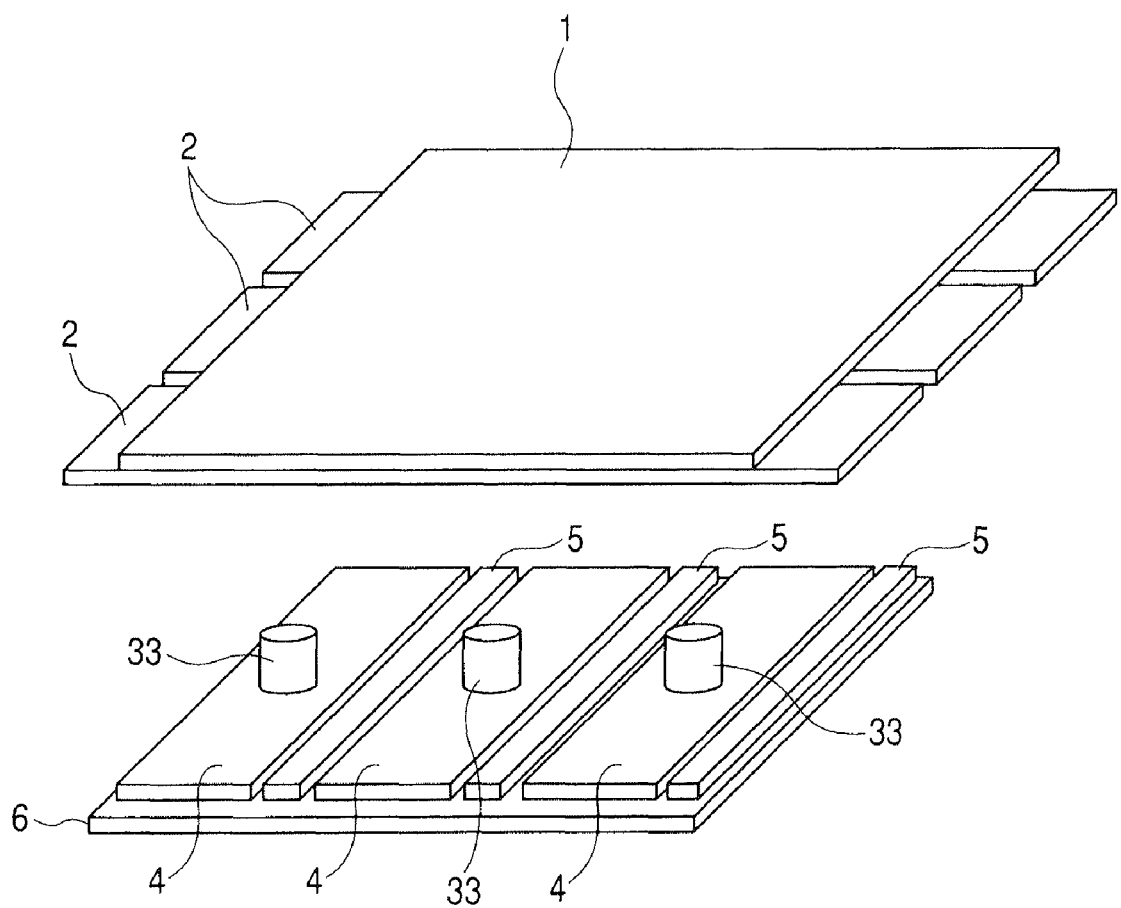
FIG. 9 is a perspective view illustrating the reflection type display apparatus in the case of performing a passive matrix driving.

In FIG. 9, the colored second electrodes 4 are arranged on the substrate 6 along a plurality of lines in one direction (assumed to be an X direction). The third electrodes 5 are arranged on the substrate 6 along a plurality of lines in parallel with the second electrodes 4. Since the third electrode 5 does not contribute to the display, it is formed by a thin line having a width smaller than that of the second electrode 4. However, when the electroplating film is formed on the second electrode 4, by forming the same electroplating film, the third electrode 5 can be made to contribute to the display.

The first electrodes 2 having the light transmitting property are arranged on the substrate 1 having the light transmitting property along a plurality of lines in the direction (assumed to be the Y direction) perpendicular to the X direction so as to intersect the second electrodes 4 arranged along a plurality of lines.

Figure 10A:
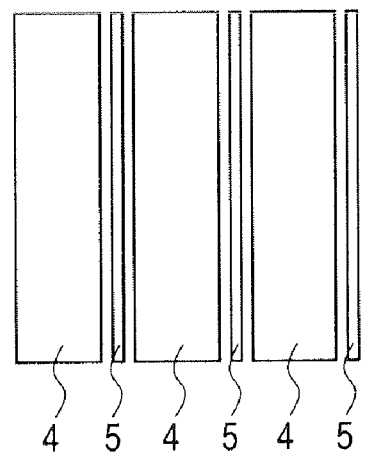
FIGS. 10A, 10B and 10C are plan views illustrating constructional examples of electrodes 4 and 5 of the invention.

The shapes of the second electrode 4 and the third electrode 5 are not limited to the shapes as illustrated in FIG. 9. As illustrated in a plan view of FIG. 10B, the line-shaped electrode 5 having "-"-shaped (line-shaped) projecting portions on one side (one side in the Y direction) so as to surround the electrode 4 in a "⊐"-character shape can be provided. As illustrated in a plan view of FIG. 10C, the line-shaped electrode 5 having "-"-shaped (line-shaped) projecting portions on both sides (both sides in the Y direction) so as to surround the electrode 4 from the both sides can be also provided. FIG. 10A is a plan view of the electrodes 4 and 5 illustrated in FIG. 9. Although the scan of the electrodes 5 can be performed by selectively supplying a current every line, such an operation that two lines are simultaneously selected, the current is supplied thereto, and the scan is shifted line by line can be also executed. According to such an operation, for example, when the current is supplied from the electrode 4 to the electrode 5, the current can be supplied from the electrode 4 to the electrodes 5 of two lines.

Figure 10B:
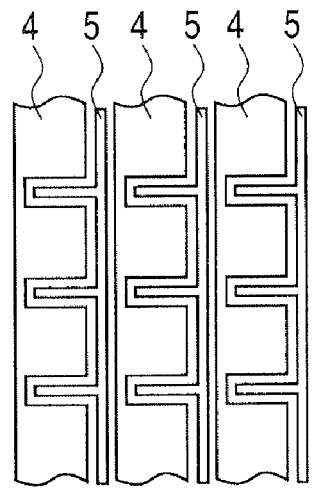
Figure 10C:
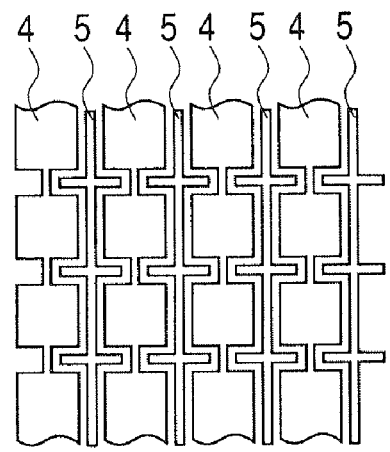

The construction in which the electrode 5 is provided along one side of the electrode 4 as illustrated in FIG. 10A, the construction in which the electrode 4 is surrounded by the electrode 5 in the "⊐"-character shape as illustrated in FIG. 10B, the construction in which the periphery of the electrode 4 is surrounded by the electrode 5 as illustrated in FIG. 10C can be also applied to the display apparatus of the active matrix driving type. However, in the case of the active matrix driving type, the electrode 4 and the electrode 5 are provided pixel by pixel.

Figure 11:
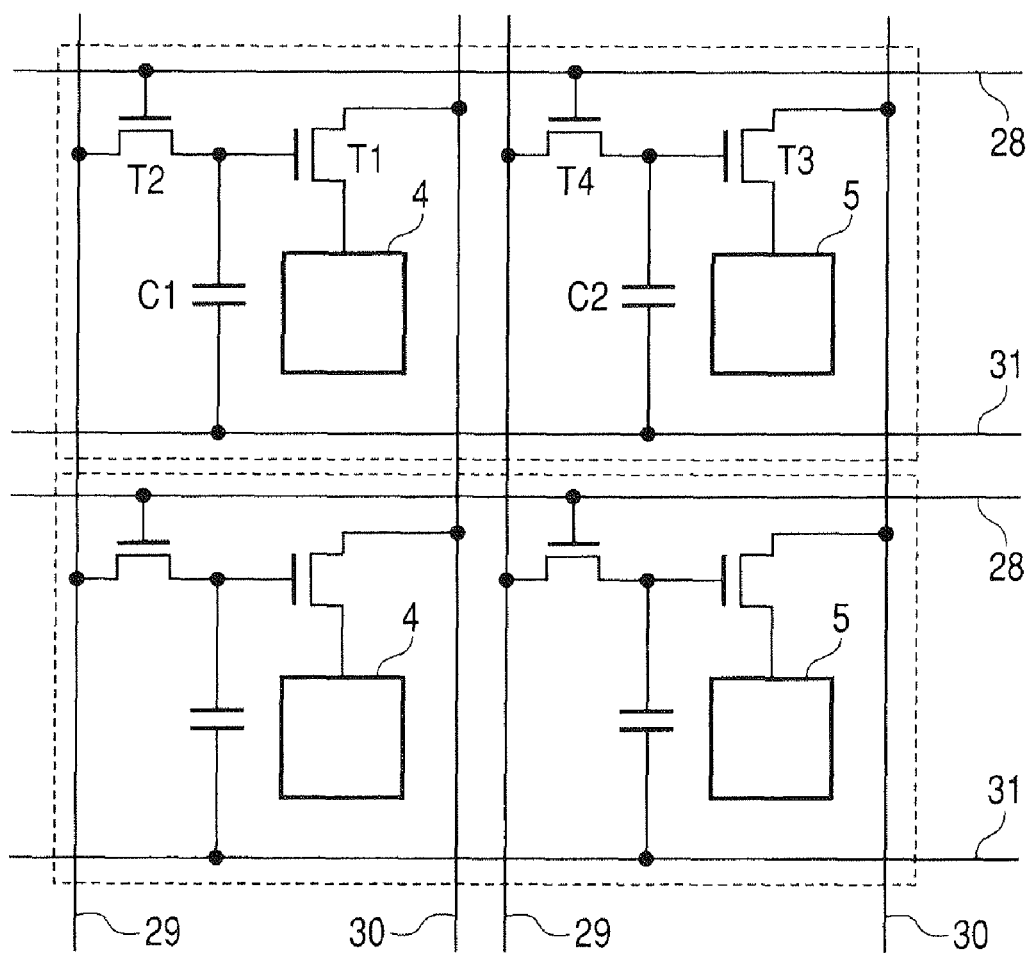
FIG. 11 is a circuit constructional diagram of the reflection type display apparatus according to the invention in the case of performing an active matrix driving.

In the case of the reflection type display apparatus of the active matrix driving type, as illustrated in FIG. 11, the electrode 4 and the electrode 5 are arranged pixel by pixel, the electrode 4 is connected to a first switch T1 of a thin film transistor (TFT) or the like, and the electrode 5 is connected to a third switch T3 of the thin film transistor (TFT) or the like. The electrodes 2 are constructed as a common electrode. A second switch T2 of the thin film transistor or the like controls an electric continuity of the first switch T1. A fourth switch T4 of the thin film transistor or the like controls an electric continuity of the third switch T3. The second switch T2 and the fourth switch T4 are connected to control terminals (functioning as gates in the case where the switches are field effect transistors (FETs)) of the first switch T1 and the third switch T3, respectively. Control terminals (functioning as gates in the case where the switches are field effect transistors) of the second switch T2 and the fourth switch T4 are connected to scanning lines (functioning as gate lines in the case where the switches are field effect transistors) 28, respectively. By the on/off control of the second switch T2 and the fourth switch T4, a data signal from a data line 29 is supplied to the control terminal of the first switch T1, a capacitor C1, the third switch T3, and a capacitor C2, respectively. The data signal is accumulated into the capacitors C1 and C2. The first to fourth switches are provided pixel by pixel. By the on/off control of the first and third switches T1 and T3, the current having the set current density flows through the first and third switches. A ground (GND) line 31 is provided.

Figure 12:
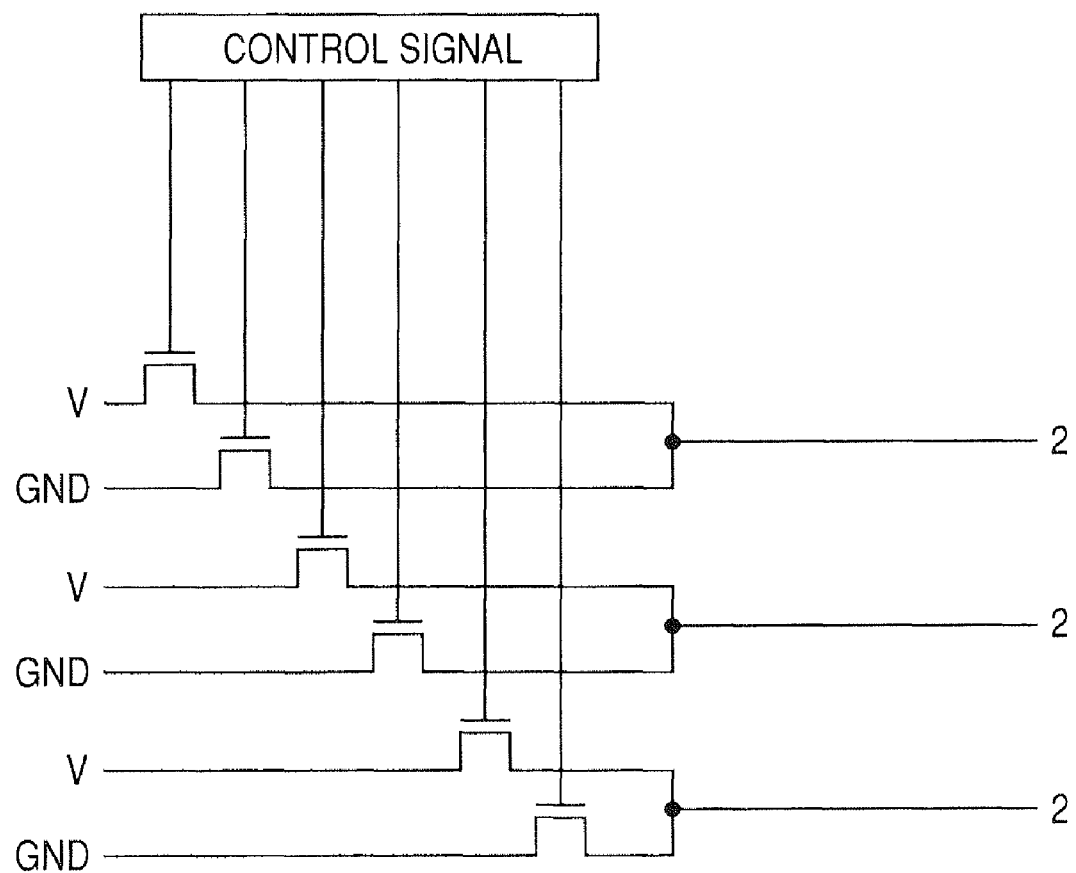
FIG. 12 is a circuit diagram illustrating a control circuit for controlling the flowing direction of a current.
Figure 13A:
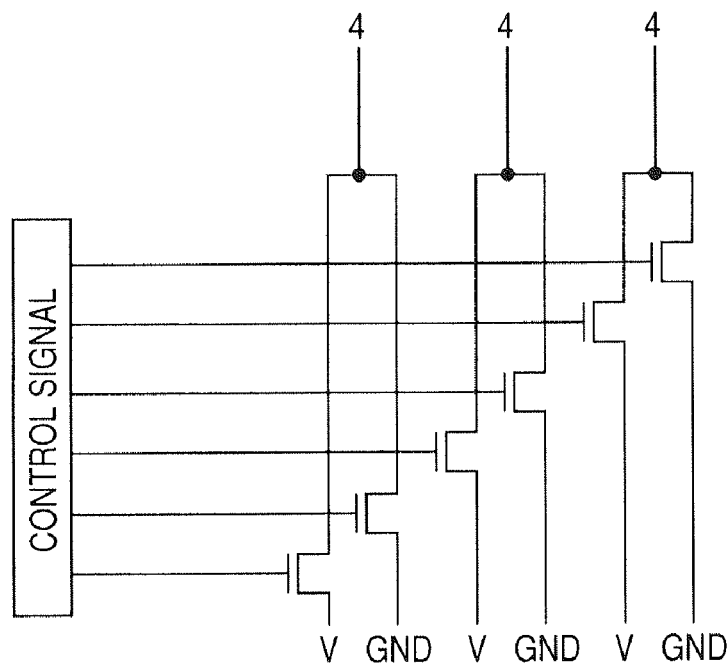
FIGS. 13A and 13B are circuit diagrams each illustrating a control circuit for controlling the flowing direction of the current.
Figure 13B:
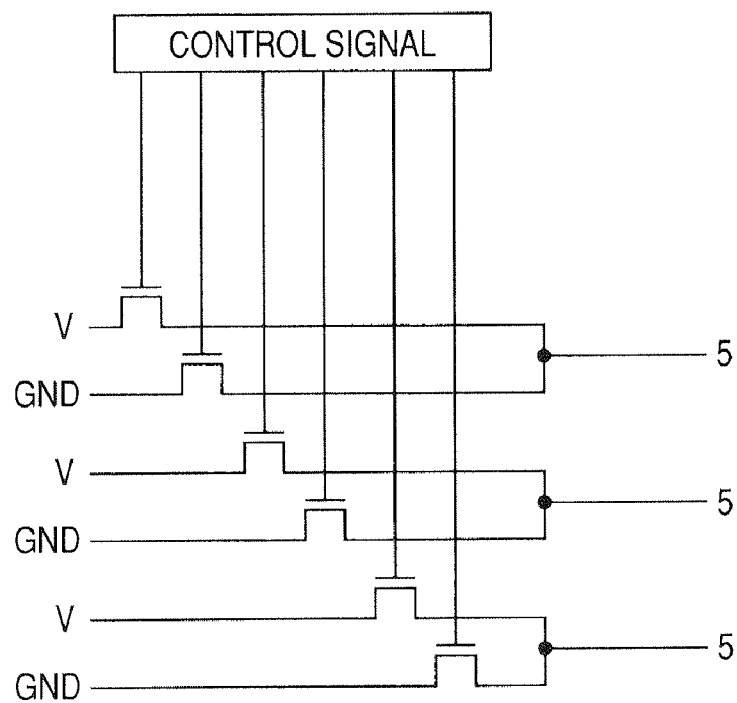

In the reflection type display apparatus of the passive matrix driving type and the reflection type display apparatus of the active matrix driving type mentioned above, two kinds of voltages are switched and applied to the electrodes 2, 4, and 5 by using a control signal circuit (serving as a control unit) illustrated in FIGS. 12, 13A, and 13B. The control signal circuit controls the current flowing direction among the three electrodes 2, 4, and 5 illustrated in FIGS. 12, 13A, and 13B. That is, when the electrode 2 is assumed to be a cathode, the electrodes 4 and 5 are assumed to be an anode, and the current is supplied to them, the electrode 2 is set to the GND and the electrodes 4 and 5 are set to a voltage V. When the electrode 4 is assumed to be the cathode, the electrodes 2 and 5 are assumed to be the anodes, and the current is supplied to them, the electrode 4 is set to the GND and the electrodes 2 and 5 are set to the voltage V. When the electrode 5 is assumed to be the cathode, the electrodes 2 and 4 are assumed to be the anodes, and the current is supplied to them, the electrode 5 is set to the GND and the electrodes 2 and 4 are set to the voltage V.

In this manner, the control signal circuit provides the first mode in which the first electroplating film which forms the first surface that is come into contact with the first electrode 2 is formed on the first electrode 2, the second mode in which the second electroplating film which forms the second surface that is not come into contact with the second electrode 4 is formed on the second electrode 4, thereby setting a state where the first electroplating film does not exist on the first electrode 2, and the third mode in which the electroplating film is formed on the third electrode 5, thereby setting a state where the first and second electroplating films do not exist on the first and second electrodes 2 and 4, respectively.

A size of pixel of the reflection type display apparatus of the embodiment is not particularly limited but is properly set according to an application. The pixel size can be set to, for example, a value within a range from about 10 μm to tens of mm.

Although barriers adapted to partition the pixels are not provided in the embodiment, such barriers may be provided as necessary. However, if the voltage which is applied across the pixels is equal to a predetermined critical voltage or less, no electroplating occurs and the pixel size can be set so that an influence of the adjacent pixel is not exerted. This point has also been disclosed in, for example, the Official Gazette of Japanese Patent Application Laid-Open No. 2004-170850.

By using the reflection type display apparatus of the embodiment, the reflectance and the absorptance of the first surface of the film which is formed by the electroplating and those of the second surface thereof differ. Specifically speaking, in the electroplating film, the surface (first surface) that is come into contact with the electrode has smoothness similar to that of the electrode and becomes a mirror surface, so that the film color (first color) becomes the color of the metal itself to be electroplated. For example, if the metal is silver, the first color is white. The surface (second surface) that is not come into contact with the electrode, that is, the surface which is come into contact with the liquid becomes a surface which is very rough and has large concave/convex shapes. While the incident light is repetitively reflected in the rough surface, it is absorbed, so that the film color (second color) becomes dark such as black, brown, or the like.

When comparing with the construction of the electrodes, in the case where the first electrode which is arranged on the obverse side is electroplated, the color (first color) of the first surface is observed, and in the case where the second electrode which is arranged on the deep side through a plating liquid is electroplated, the color (second color) of the second surface is observed.

The larger the thickness of electroplating film is, the larger a color concentration is. That is, the larger the film thickness is, the higher the reflectance of the first surface is and the higher the absorptance of the second surface is. In both surfaces, the smaller the film thickness is, the transmitting ratio rises and the film approaches a transparent state. The electroplating film thickness is almost proportional to a plating time and a current density and can be controlled.

A third color which is realized by using the third electrode and is performed by the state where the electroplating is not performed to the first and second electrodes can be expressed. The third color becomes the color of the second electrode itself in the case where the second electrode is made of a substance adapted to reflect the light in a particular wavelength range. The third color becomes transparent in the case where the second electrode is made of a transparent substance. When the third color is transparent, by laminating a reflection plate which reflects the light in a particular wavelength range under the reflection type display apparatus, the specific color can be displayed.

As a more specific example, a reflection type display apparatus in which the first color is white, the second color is black, the second electrode is transparent, and the third color is determined by the reflection plate, or the like can be realized. In a state where the first electrode has been plated in white as a first color, the incident light is reflected without being subjected to the wavelength selection, so that the reflection at a high reflectance can be performed. Particularly, since the incident light is reflected over the whole wavelength range without being absorbed by the color filter or the like as compared with the related art, the white display at a high reflectance can be obtained. Similarly, black as a second color and the third color by the reflection plate can be displayed. By combining the foregoing states, the reflection type display apparatus which can perform the white display at the high reflectance and can perform the color display can be realized.

Subsequently, a specific apparatus construction of the invention will be described with reference to FIGS. 4A to 4C. Glass having a thickness of 0.7 mm is used as a substrate 1. An ITO film having a thickness of 150 nm formed by a sputtering method is used as a first electrode 2. As an electrolyte solution 3, a solution in which dimethylformamide (DMF) is used as a solvent, silver chloride of 300 mmol/L is used as an electroplating seed, and copper-sulfate 5 hydrate of 100 mmol/L is contained is used. This solution contains a solution in which tetrabutyl ammonium bromide (TBAB) of 1 mol/L is used as a supporting electrolyte and a glossy agent is contained. The pixel size is set to 0.7 mm×0.7 mm and a thickness of the electrolyte layer 3 is set to 0.1 mm. An ITO film similar to that of the first electrode 2 is used as a second electrode 4. Silver is used as a third electrode 5. Glass is used as a supporting substrate 6. The reflection plates 17, 18, and 19 each for reflecting the light of a particular wavelength range are provided for the rear surface of the glass.

When the first electrode 2 is assumed to be the cathode, the second electrode 4 and the third electrode 5 are assumed to be the anodes, and an electric potential of 1.5V is applied to them, a current of 10 mA/cm$^2$ flows and the electroplating film is formed on the surface of the first electrode, so that white is observed from the obverse surface. When the second electrode 4 is assumed to be the cathode, the first electrode 2 and the third electrode 5 are assumed to be the anodes, and the electric potential of 1.5V is applied to them, the current of 10 mA/cm$^2$ flows and the electroplating film is formed on the surface of the electrode 4, so that black is observed from the obverse side.

When third electrode 5 is assumed to be the cathode, the first electrode 2 and the second electrode 4 are assumed to be the anodes, and an electric potential of 1.5V is applied to them, the current of 10 mA/cm$^2$ flows and the electroplating film formed on the surfaces of the electrodes 2 and 4 are dissolved and extinguished. After the incident light passed through the electrodes 2 and 4, it is reflected by the reflection plates 17, 18, and 19 and passes through the electrodes 2 and 4 again. Therefore, the color of the wavelength range reflected by the reflection plates is observed from the obverse surface. Although the reflection plate is used as a reflector in the embodiment, the reflector can be constructed by forming a reflecting layer which reflects the light of the specific color onto the substrate 6 pixel by pixel by printing or the like. The reflector may be constructed by forming a color filter onto the substrate 6 and arranging the reflection plate onto the color filter.

In the embodiment, besides the glass, a solid having a light transmitting property such as a resin can be used as a substrate having the light transmitting property which protects the obverse surface. For the first electrode 2 and the second electrode 4, besides the ITO, IZO (Indium-Zinc-Oxide), zinc oxide, titanium oxide, or another conductive transparent substance can be used as a material of the transparent electrode. A metal thin film or a mesh structure or comb-tooth structure of a metal can be also used so long as it has the light transmitting property. For the third electrode 5, platinum, carbon, gold, or the like can be used so long as it is a conductor of the same kind as that of the metal which is electroplated or a stable conductor which is not changed by the electroplating reaction. Besides them, a transparent material such as ITO or the like can be also used. In the case where the electrode 4 is colored and has characteristics adapted to reflect the light in the particular wavelength range, the reflection plates 17, 18, and 19 of the pixel can be omitted. Each of the reflection plates 17, 18, and 19 is formed by arranging colored paper onto a glass substrate having a thickness of 0.1 mm. The reflection plate is laminated onto the substrate 6 so that the paper is come to contact with the substrate 6.

By constructing the reflection plates 17, 18, and of the reflection type display apparatus of the embodiment as reflection plates of three colors of red, green, and blue and arranging them by a Bayer layout in a matrix form, the reflection type display apparatus which can perform the color display is formed. The pixels are driven by an active matrix driving manner using transistors. A color layout of the reflection plates is not limited to the Bayer layout. A color arrangement is not limited to the foregoing construction but a construction of cyan, magenta, and yellow may be used. The pixels may be driven by a passive matrix driving manner using crossed electrodes.

Fourth Embodiment

Figure 6:
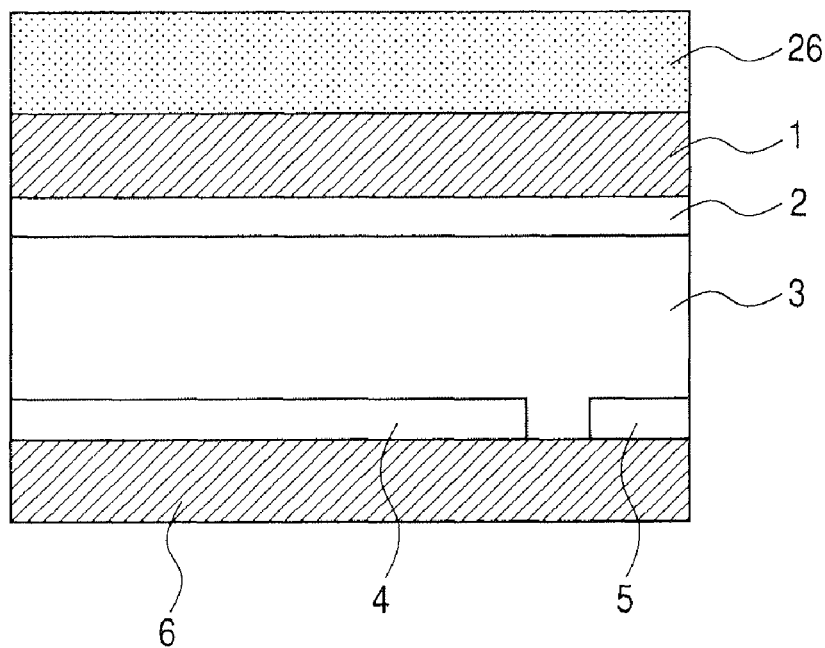
FIG. 6 is a cross sectional view of a pixel of a reflection type display apparatus of the fourth embodiment of the invention.

FIG. 6 is a cross sectional view of a pixel of a reflection type display apparatus of the fourth embodiment of the invention. FIG. 6 has a construction in which a diffusion sheet 26 is further added to the construction in FIG. 3 or FIGS. 4A to 4C. By using the diffusion sheet 26, a viewing angle is widened more than that of the reflection type display apparatus of FIG. 3 or FIGS. 4A to 4C and a display image is closer to an image of the paper and the image can be displayed so that it can be easily seen.

A position where the diffusion sheet 26 is arranged is not limited to the most-obverse surface but may be set to an arbitrary position on the obverse surface side rather than the "metal film which reflects the light" which is formed by the electroplating. A material is not limited to the diffusion sheet but another member may also have a diffusing function. For example, a structure in which the supporting substrate 1 or the first electrode 2 has the light diffusing effect may be used.

Fifth Embodiment

FIG. 7 is a cross sectional view of a pixel of a reflection type display apparatus of the fifth embodiment of the invention. In order to obtain an effect similar to that in the embodiment 2, a concave/convex pattern having a pitch of 0.05 mm is formed by a photolithographing step and a wet etching on the surface of the transparent electrode 2 in FIG. 3 or FIGS. 4A to 4C which is come into contact with the electrolyte solution 3. Other constructions are similar to those in FIG. 3 or FIGS. 4A to 4C. If a metal film which reflects the light is electroplated onto the transparent electrode 2 having the concave/convex pattern, since the light is scattered by the concave/convex shapes, the white display having good quality near the paper can be performed. It is sufficient that the concave/convex pattern has a function for scattering the light and it is needless to say that a pitch size, a layout, an electrode material, and the like are not limited to the foregoing numerical values and the like.

Sixth Embodiment

FIG. 8 is a cross sectional view of a pixel of a reflection type display apparatus of the sixth embodiment of the invention. FIG. 8 has a construction similar to that in FIG. 3 or FIGS. 4A to 4C except that the second electrode 4 is made of a transparent material and a multilayer film 27 as a reflector constructed so as to reflect the light in the particular wavelength range is arranged between the supporting substrate 6 and the second electrode 4. By laminating a film having a thickness of n·d=m·λ/2 (n denotes a refractive index, d a film thickness, and m an integer) for a wavelength 2 of the light to be reflected and having a different refractive index, the good selective reflection can be performed.

For example, in order to reflect blue having a wavelength of 450 nm, by alternately laminating three layers of a film made of silica and having a thickness of 308 nm (a refractive index is equal to 1.46) and a film made of titania and having a thickness of 180 nm (a refractive index is equal to 2.5), the blue light can be desirably reflected.

The green light having a wavelength of 550 nm can be reflected by laminating three layers of a silica film of 377 nm and a titania film of 220 nm. The red light having a wavelength of 700 nm can be reflected by laminating three layers of a silica film of 479 nm and a titania film of 280 nm. In order to allow a desired pixel to have desired reflecting characteristics, the photolithography and the etching can be used. A material and a thickness of the multilayer film are not limited to them but proper material and thickness can be selected according to a necessary wavelength range to be reflected.

Seventh Embodiment

It is an object of the embodiment to provide a display apparatus of an electrodepositing type which can continuously maintain an image for a long time. According to the embodiment, there is provided a display apparatus in which an electroplating is formed on an electrode and which is used for modulating light, wherein a layer having an insulator having air gaps therein and conductive fine particles dispersed in the air gaps is formed on the electrode. According to the embodiment, a display contrast can be further raised, a deterioration in display contrast that is caused by redissolution of a deposited metal can be suppressed, and a display holding period can be improved.

Figure 16:
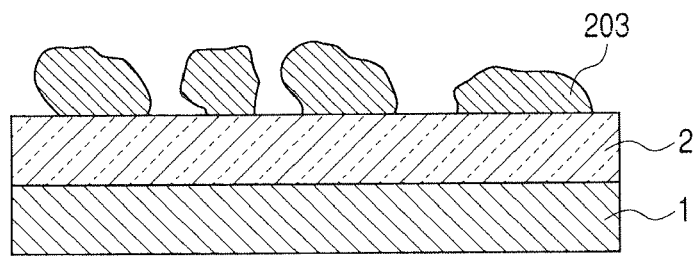
FIG. 16 is a schematic diagram of an electrode of the first comparative example.

FIG. 16 illustrates a schematic cross sectional view of the first electrode 2 in which nothing is formed on the surface as a first comparative example. FIG. 16 illustrates a state where an electroplating process has been executed and metal has been deposited as an electroplating. In the case of such a construction in the related art, when a relatively high voltage is applied in order to raise a response speed, metal ions serving as an electroplating layer are deposited in a particle shape onto the electrode 2. Therefore, a coloring efficiency and the contrast deteriorate. There is such a problem that since a contact area between a deposited metal 203 and the solution is large, if the metal is left, the metal 203 is redissolved, the display is weakened, and the contrast deteriorates.

Figure 17A:
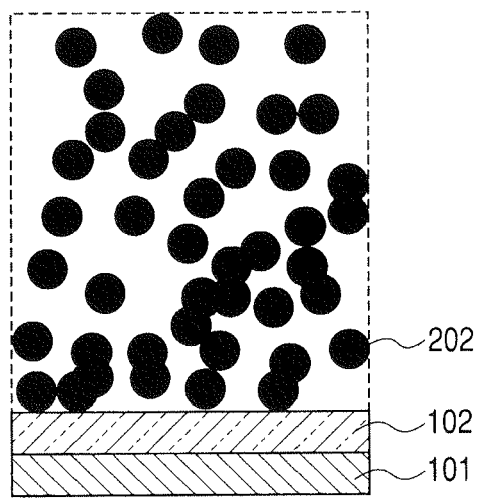
FIGS. 17A and 17B are schematic diagrams each illustrating an electrode of the second comparative example.
Figure 17B:
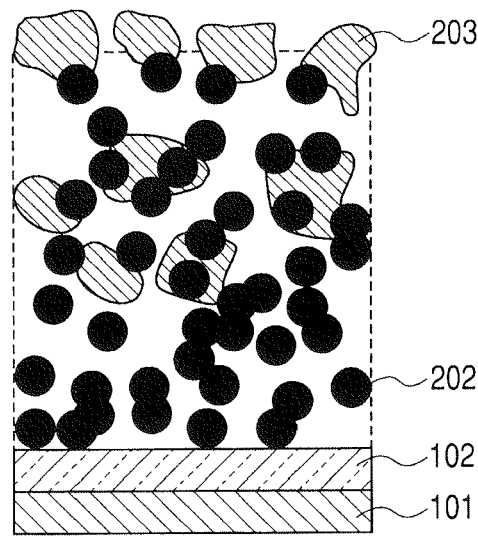

Subsequently, as a second comparative example, FIGS. 17A and 17B illustrate schematic diagrams in the case where a layer formed by conductive fine particles 202 is formed on the electrode as disclosed in the Official Gazette of Japanese Patent Application Laid-Open No. 2005-092183. FIG. 17A illustrates a state before the electroplating is executed. FIG. 17B illustrates a state where the metal has been deposited as an electroplating layer after the electroplating process was executed. In this case, an amount of deposited metal 203 increases owing to a surface area effect by the conductive fine particles 202 and the contrast rises. However, also in this case, since the contact area where the deposited 203 is come into contact with the solution is large, if the metal is left, the deposited metal 203 is redissolved, the display is weakened, and the contrast deteriorates. Such a phenomenon occurs by the following reasons. First, since the conductive fine particles are come into contact with the solution and exist densely, the current becomes liable to flow in the conductive fine particles by the applied voltage and the deposition of the metal particles occurs mainly on the most-obverse surface of the electrode. Second, since there are no substances which obstruct the contact between the deposited metal particles and the solution, the metal is easily redissolved.

Figure 14:
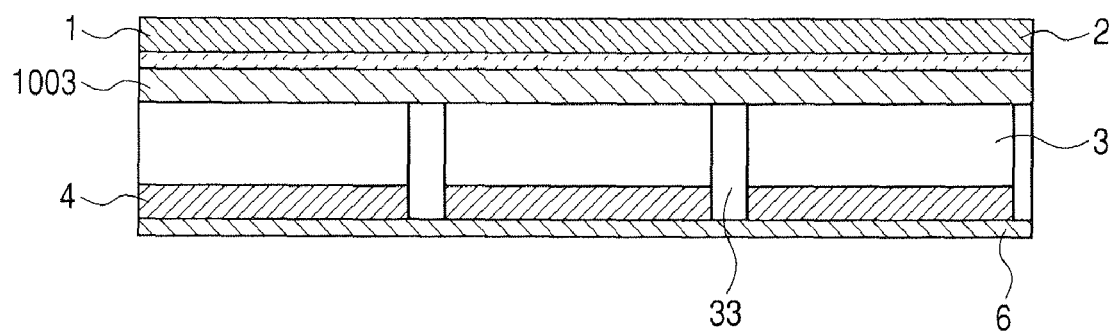
FIG. 14 is a cross sectional view of a display apparatus of the seventh embodiment of the invention.
Figure 15A:
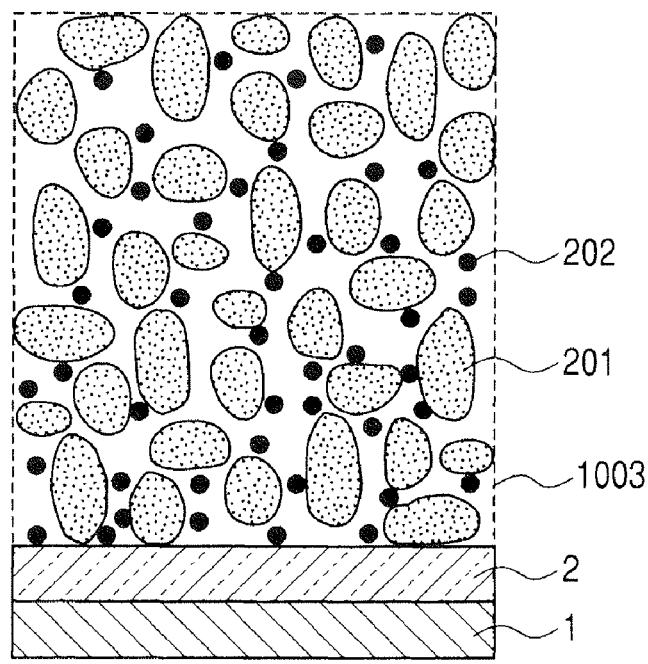
FIGS. 15A and 15B are schematic diagrams each illustrating a layer in which conductive fine particles are dispersed in an insulator having air gaps therein according to the invention.
Figure 15B:
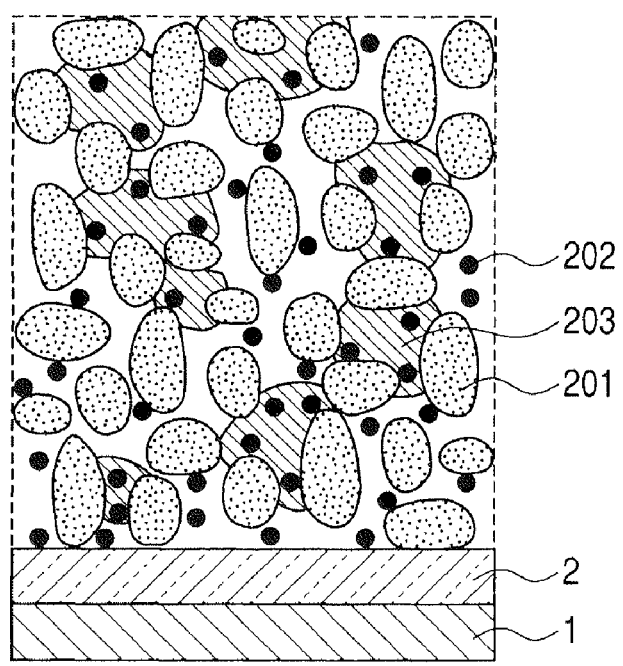

For the construction as mentioned above, a layer 1003 in which the conductive fine particles 202 have been dispersed in air gaps of an insulator 201 having the air gaps therein is formed on the first electrode 2 in the embodiment. FIGS. 14, 15A, and 15B illustrate enlarged diagrams of the layer 1003 in which the conductive fine particles have been dispersed in the air gaps of the insulator having the air gaps therein is formed on the transparent electrode 2. FIG. 15A illustrates a state before the electroplating is executed. FIG. 15B illustrates a state where the metal has been deposited after the electroplating process was executed. As illustrated in FIG. 15A, since the conductive fine particles 202 have been dispersed in the air gaps in the insulator, a state where the conductive fine particles 202 exist densely as disclosed in the related art does not occur. Since the conductive fine particles 202 exist in such air gaps, the contact area between the conductive fine particles and the solution is remarkably reduced.

If a ratio (porosity) of the air gaps to the whole volume of the layer which is formed by the insulator 201 is too small, since an amount of electroplating which can be deposited in the air gaps decreases, there is a possibility that a sufficient light shielding property cannot be obtained. Therefore, the insulator 201 has to be thickened in order to obtain the sufficient light transmitting property and it is undesirable. This is because if the insulator 201 is too thick, an amount of light scattering increases and the sufficient light shielding property cannot be obtained at the time of the transmitting display. Therefore, the porosity is set to, desirably, 5% or more, and much desirably, 50% or more. With respect to a size of air gap (air gap size), it is demanded that the air gap size is sufficiently smaller than the pixel size. This is because if the air gap size is larger than the pixel size, a current density in the pixel does not become uniform. For example, a porous layer whose partition is extremely thin or the like can be used since its porosity is large and the air gap size is small.

As illustrated in FIG. 15B, in the case where the first electrode 2 has the layer in which the conductive fine particles 202 have been dispersed in the air gaps of the insulator 201 having the air gaps therein, if the electroplating is performed, the metal ions are deposited in a particle shape onto the conductive fine particles 202 so as to embed the air gaps. This is because of the following reasons. In an electrode in which the fine particles of the insulator 201 and the conductive fine particles 202 have been mixed and sintered on the surface, the conductive fine particles 202 are come into contact with each other and are mutually conductive. There are also portions where the conductive fine particles 202 and the transparent electrode 2 are in contact with each other. Therefore, the electric coupling in a range from the transparent electrode 2 to a plurality of conductive fine particles 202 exists at a plurality of positions in the pixel. The current flows from the transparent electrode 2 to the electroplating liquid through the plurality of conductive fine particles 202. Therefore, the electroplating occurs near a front edge of the conductive fine particle 202. Further, by such a chain reaction that the fine particles of the metal 203 which grew by the electroplating are coupled with neighboring other conductive fine particles 202 or the like, the portion where the electroplating occurs changes moment by moment and the deposition of the fine particles of the metal 203 occurs at a plurality of positions in the porous layer.

The insulator 201 plays a role of what is called a footing for supporting the conductive fine particles 202. Therefore, if the insulator 201 has conductivity, since the fine particles depositing step is not satisfied, it is demanded that the insulator 201 is insulative. If the electric potential is shut off, the metal 203 which was field-deposited in the above step is naturally redissolved according to a diffusion rule. However, if a concentration of the metal in the ambient solution is high, the dissolution is suppressed. Since the circulation of the solution is suppressed in the porous layer, the redissolved metal ions are difficult to be diffused into the whole solution, so that the metal concentration in the solution is held high. Consequently, the redissolution can be suppressed by using the porous layer. Although the "suppression of the field deposition" due to the porous layer also occurs at the time of the field deposition by the same mechanism, it can be solved by raising a deposition potential.

The contact between the electrolyte solution and the metal serving as a deposited electroplating can be suppressed by the reasons as mentioned above, so that the dissolution of the metal 203 into the solution can be reduced.

The following material can be desirably used as an insulator 201 having the air gaps therein: for example, an inorganic insulative material such as titanium oxide, silicon oxide, zinc oxide, or aluminum oxide; their mixture; glass; or the like. An organic insulative material such as polymethyl methacrylate (PMMA), polystyrene, silicone, cellulose, polycarbonate, polyethylene, polypropylene, or polyethylene terephthalate, or the like can be also used. To raise the contrast, it is desirable that the layer in which the conductive fine particles 202 have been dispersed in the insulator 201 having the air gaps therein is transparent. It is, therefore, much desirable that the insulator 201 has the light transmitting property for the visible light and its refractive index is close to that of the electrolyte solution. Since a refractive index of water, propylene carbonate, gamma-butyrolactone, dimethylformamide, or the like which is used for the electrolyte solution is generally so small to be equal to 1.5 or less, it is desirable that the refractive index of the insulator 201 having the air gaps therein is equal to about 2 or less. As an inorganic insulative material having such a feature, silicon oxide, aluminum oxide, or the like can be mentioned. It is, therefore, much desirable to use a mixture containing them as a main component, glass, or the like. An organic insulative material such as polymethyl methacrylate (PMMA), polystyrene, silicone, or the like is also suitable because its refractive index is small.

As a structure of the layer of the insulator 201 having the air gaps therein, there can be used: a structure in which insulative fine particles are stacked; a structure in which the conductive fine particles 202 are dispersed into porous glass by a sol-gel method, or a structure in which the conductive fine particles 202 are dispersed into a porous resin. Particularly, the stacked layer of the insulative fine particles is suitable because it can be easily produced by dispersing and mixing the insulative fine particles and the conductive fine particles 202 into a solvent, coating the electrode with the resultant mixture, and sintering them.

In the structure in which the insulative fine particles are stacked as mentioned above, an inorganic insulative material such as titanium oxide, silicon oxide, zinc oxide, alumina, or the like, their mixture, glass, or the like can be used as insulative fine particles. An organic insulative material such as polymethyl methacrylate (PMMA), polystyrene, silicone, cellulose, polycarbonate, or the like can be also used. Among them, particularly, silicon oxide, aluminum oxide, or the like, a mixture containing them as a main component, glass, polymethyl methacrylate (PMMA), polystyrene, or silicone is suitable in terms of a point that it is not dissolved into the organic solvent and a point that the refractive index is small.

Metal fine particles of platinum or the like or particles of general metal oxide can be used as conductive fine particles 202. From a viewpoint of the contrast, it is desirable that the layer 1003 in which the conductive fine particles 202 have been dispersed in the air gaps of the insulator 201 having the air gaps therein is transparent. It is, therefore, desirable that the conductive fine particles 202 are made of a metal oxide. Specifically speaking, zinc oxide, indium oxide, tin oxide, or the like, or a material obtained by doping impurities to them is desirable. Specifically speaking, ITO, F-doped tin oxide, a mixture of them, or the like can be mentioned. Particularly, indium oxide or tin oxide which is difficult to be oxidized/reduced by the electroplating is desirable.

Since the conductive fine particles 202 are dispersed in the air gaps in the insulator 201, the metal 203 is deposited into the air gaps upon electroplating. It is, therefore, desirable that a mean diameter of the conductive fine particles 202 is sufficiently smaller than the air gaps in the insulator 201. Therefore, in the method of stacking the insulative fine particles, it is desirable that the mean diameter of the conductive fine particles is smaller than a mean diameter of the insulative fine particles. Since the conductive fine particles have the relatively large refractive index and are liable to scatter the light, it is desirable that the mean diameter of the conductive fine particles is less than 100 nm.

The elements disclosed in the foregoing embodiment are suitably used as an element of the metal 203 which is deposited by the electroplating process.

Although Examples of the embodiment will be described hereinbelow, the invention not limited to the following Examples.

Example 1

In this Example, the apparatus structure illustrated in FIG. 14 is manufactured. Glass having a thickness of 0.7 mm is used as a substrate 1. An ITO film having a thickness of 150 nm formed by the sputtering method is used as a first electrode 2. As an electrolyte solution 3, a solution in which propylene carbonate (PC) is used as a solvent, silver sulfate of 0.033 mol/L is used as an electroplating seed, tetraethyl ammonium bromide (TEAB) of 0.267 mol/L is used as an electrolyte, and a glossy agent is contained is used. A pixel size is set to 0.7 mm×0.7 mm. A thickness of electrolyte solution 104 is set to 0.1 mm. Silver is used for a counter electrode 105. Glass is used for a supporting substrate 106. The layer 1003 in which the conductive fine particles have been dispersed in the insulator having the air gaps therein is formed by fine particles of silicon oxide and fine particles of tin oxide. In this instance, colloidal silica PL-20 (grain diameter is equal to 220 nm) produced by Fuso Chemical Industry Co., Ltd. is used as silicon oxide and tin oxide sol EPS-6 (grain diameter is equal to 5 nm) produced by Yamanaka Industry Co., Ltd. is used as tin oxide. A producing method of the layer 1003 will be described hereinbelow.

First, colloidal silica PL-20 of 2 ml and tin de sol of 2 ml are mixed and the solution is mixed by a stirrer for about 10 minutes. After that, polyethylene glycol (molecular weight is equal to 20000) of 3 g is added, a viscosity is adjusted, and its paste is sufficiently kneaded for about 10 minutes. Subsequently, a polyimide tape (trademark: Kapton) is adhered onto the ITO substrate so as to mask its both ends and is fixed. Then, the paste is dropped and spread by slide glass, thereby coating with the paste having a thickness of about 50 µm of the polyimide tape. The paste is dried for 20 minutes at temperatures of 160 to 200° C. Subsequently, a temperature is raised from a room temperature to 450° C. for 30 minutes, a sintering is performed at 450° C. for 30 minutes, and an annealing is naturally performed to the room temperature.

As for the film formed as mentioned above, in the air, since the light is scattered, the film shows a cloudy external appearance. However, in the solution, since the liquid permeates, the film shows an almost transparent external appearance.

On the other hand, an apparatus having a texture $SnO_2$ electrode (TCO substrate for a solar battery: A10U80 produced by Asahi Glass Co., Ltd.) in which silver is deposited in a particle shape in the related art is prepared as Comparative Example 1. An apparatus having another electrode in the related art is also prepared as Comparative Example 2. A producing method of such electrodes will now be described. First, conductive fine particles (FS-10P produced by Ishihara Sangyo Kaisha, Ltd.) of 3.7 g are mixed into the pure water of 16 ml, thereafter, polyethylene glycol (molecular weight is equal to 20000) of 0.37 g is added, and a viscosity is adjusted. Its paste is sufficiently kneaded for about 10 minutes. After that, the ITO substrate is coated with the paste and the paste is dried and sintered in a manner similar to Example 2.

Subsequently, the electroplating is executed by using the first electrode 2 in this Example in which the layer 1003 in which the conductive fine particles were dispersed in the insulator having the air gaps therein has been formed on the surface and the second electrode 4 made of silver. According to the electrodes of Comparative Examples 1 and 2, the electroplating process is also similarly executed. Specifically speaking, a voltage of 3.5V is applied to the electroplating liquid for 20 seconds so that the first electrode 2 is set to a negative polarity, thereby depositing the electroplating layer.

A section SEM observation is performed to the electroplating of Example formed in this manner. Thus, it has been found that in the air gaps in the insulator in the layer 1003 in which the conductive fine particles were dispersed in the insulator having the air gaps therein, the silver particles of 100 to 200 nm were deposited while setting the conductive fine particle to a start point. An external appearance in which a reflectance is small and it is desirably black is obtained.

Subsequently, the electroplating films of Comparative Examples 1 and 2 are also similarly observed. Thus, it has been found that the colors of the electroplating films are black and their transmitting ratios and reflectances are small. It has also been found that the electroplating of Comparative Example 1 has such a structure that the silver particles of 100 to 200 nm are distributed on the surface of the electrode in a particle form. It has also been found that the electroplating of Comparative Example 2 has such a structure that silver is hardly deposited in the air gaps formed by the conductive fine particles and the silver particles of 100 to 200 nm are distributed near the surface in a particle form.

Figure 18A:
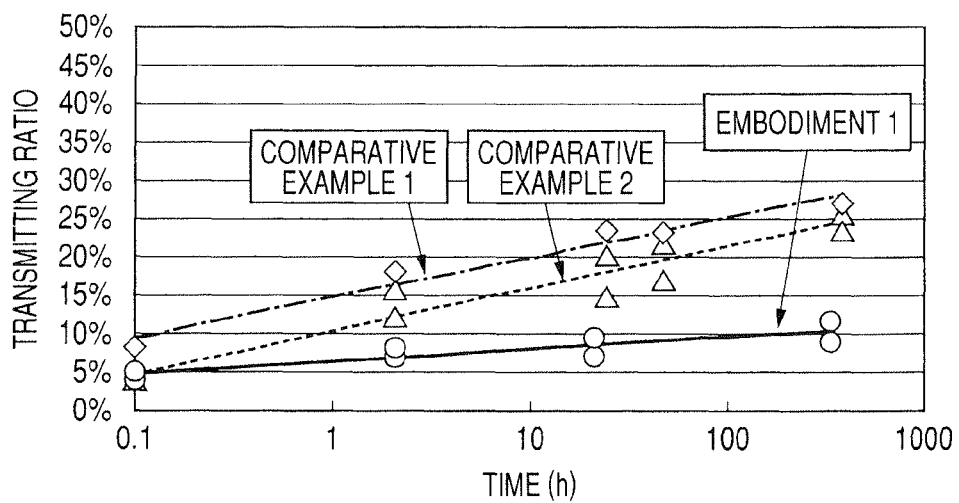
FIGS. 18A and 18B are diagrams illustrating display memory performance of the display apparatus of an embodiment of the invention.
Figure 18B:
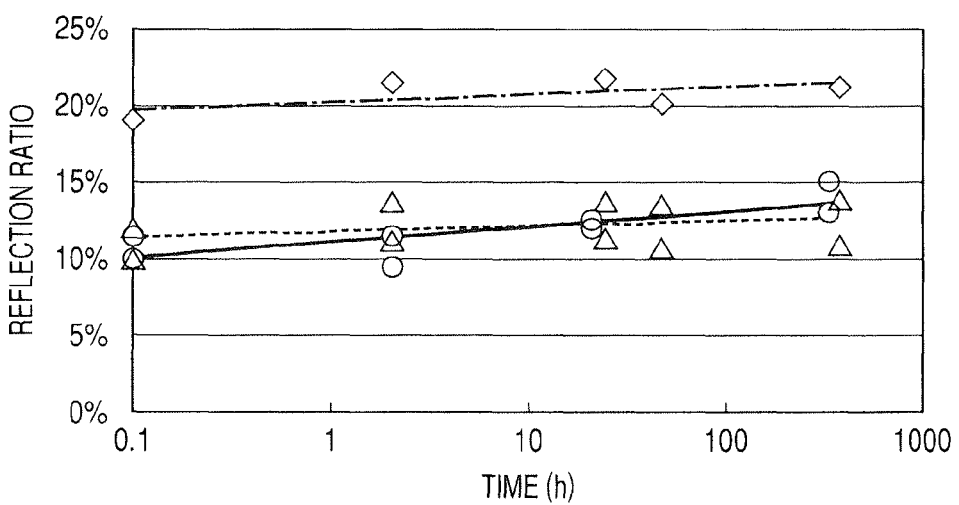

Subsequently, those electroplating films are held in the electroplating solution and changes in transmitting ratios and reflectances of the electroplating films are examined. FIGS. 18A and 18B are diagrams in each of which the changes in transmitting ratios and reflectances to a dipping time into the electroplating solution are plotted. It will be understood from FIGS. 18A and 18B that in Example 1 (solid line), the initial transmitting ratio is equal to 4%, the reflectance is equal to about 10 to 12%, and the good black can be displayed. On the other hand, in each of Comparative Examples 1 (dot and bar line) and 2 (dotted line), it will be understood that the transmitting ratio rises with the elapse of the time and silver is dissolved in the solution. According to the electroplating film of Example 1, however, it will be understood that since the time-dependent increase in transmitting ratio is smaller than and an increase in reflectance is similar to that of each of the Comparative Examples 1 and 2, better display memory performance is obtained.

Example 2

In this Example, the layer 1003 in which the conductive fine particles have been dispersed in the insulator having the air gaps therein is produced by fine particles of aluminum oxide and fine particles of tin oxide.

As a film 1003, easy-sintering alumina TM-5 (grain diameter is equal to 200 nm) produced by Daimei Chemical Industry Co., Ltd. is used as aluminum oxide, tin oxide sol EPS-6 (grain diameter is equal to 5 nm) produced by Yamanaka Industry Co., Ltd. is used as tin oxide, and the mixing, coating, drying, and baking are executed in a manner similar to Example 1. Those films are held in the electroplating solution and changes in transmitting ratios and reflectances of the electroplating films are observed. Thus, it has been found that in a manner similar to Example 1, an increase in transmitting ratio is smaller than that of each of compared with Comparative Examples 1 and 2 and better display memory performance is obtained.

Example 3

In this Example, the layer 1003 in which the conductive fine particles have been dispersed in the insulator having the air gaps therein is produced by fine of polymethyl methacrylate and fine particles of tin oxide.

First, EPOSTAR (registered trademark) MX MX100W (grain diameter is equal to 150 to 200 nm) produced by Nippon Shokubai Co., Ltd. is prepared as polymethyl methacrylate and tin oxide sol EPS-6 (grain diameter is equal to 5 nm) produced by Yamanaka Industry Co., Ltd. is prepared as tin oxide. The mixing, coating, drying, and baking at a temperature of 150° C. are executed by using them in a manner similar to Example 1. Those films are held in the electroplating solution and changes in transmitting ratios and reflectances of the electroplating films are observed. Thus, it has been found that in a manner similar to Example 1, an increase in transmitting ratio is smaller than that of each of the Comparative Examples 1 and 2 and better display memory performance is obtained.

Example 4

In this Example, the layer 1003 in which the conductive fine particles have been dispersed in the insulator having the air gaps therein is produced by fine particles of polystyrene and fine particles of tin oxide.

Microsphere 3200A (grain diameter is equal to 200 nm) produced by Moritex Corporation is used as polystyrene and tin oxide sol EPS-6 (grain diameter is equal to 5 nm) produced by Yamanaka Industry Co., Ltd. is used as tin oxide. The mixing, coating, drying, and baking at a temperature of 150° C. are executed in a manner similar to Example 1. Those films are held in the electroplating solution and changes in transmitting ratios and reflectances of the electroplating films are observed. Thus, it has been found that in a manner similar to Example 1, an increase in transmitting ratio is smaller than that of each of the Comparative Examples 1 and 2 and better display memory performance is obtained.

Example 5

In this Example, the layer 1003 in which the conductive fine particles have been dispersed in the insulator having the air gaps therein is produced by fine particles of silicone and fine particles of tin oxide.

Silicon resin powder X-52-854 (grain diameter is equal to 800 nm) produced by Shin-Etsu Chemical Co., Ltd. is used as silicone and tin oxide sol EPS-6 (grain diameter is equal to 5 nm) produced by Yamanaka Industry Co., Ltd. is used as tin oxide. The mixing, coating, drying, and baking at a temperature of 300° C. are executed in a manner similar to Example 1. Those films are held in the electroplating solution and changes in transmitting ratios and reflectances of the electroplating films are observed. Thus, it has been found that in a manner similar to Example 1, an increase in transmitting ratio is smaller than that of each of the Comparative Examples 1 and 2 and better display memory performance is obtained.

Example 6

In this Example, the layer 1003 in which the conductive fine particles have been dispersed in the insulator having the air gaps therein is produced by fine particles of silicon oxide and fine particles of ITO containing indium oxide as a main component.

Colloidal silica PL-20 (grain diameter is equal to 220 nm) produced by Fuso Chemical Industry Co., Ltd. is used as silicon oxide and NANOTEK ITO (grain diameter is equal to 30 nm) produced by CI Chemical Industry Co., Ltd. is used as ITO. The mixing, coating, drying, and baking at a temperature of 450° C. are executed in a manner similar to Example 1. Those films are held in the electroplating solution and changes in transmitting ratios and reflectances of the electroplating films are observed. Thus, it has been found that in a manner similar to Example 1, an increase in transmitting ratio is smaller than that of each of the Comparative Examples 1 and 2 and better display memory performance is obtained.

Example 7

In this Example, the layer 1003 in which the conductive fine particles have been dispersed in the insulator having the air gaps therein is produced by fine particles of silicon oxide and fine particles of zinc oxide.

Colloidal silica PL-20 (grain diameter is equal to 220 nm) produced by Fuso Chemical Industry Co., Ltd. is used as silicon oxide and NANOTEK ITO (grain diameter is equal to 34 nm) produced by CI Chemical Industry Co., Ltd. is used as zinc oxide. The mixing, coating, drying, and baking at a temperature of 450° C. are executed in a manner similar to Example 1. Those films are held in the electroplating solution and changes in transmitting ratios and reflectances of the electroplating films are observed. Thus, it has been found that in a manner similar to Example 1, an increase in transmitting ratio is smaller than that of each of the Comparative Examples 1 and 2 and better display memory performance is obtained.

The invention can be used for the reflection type display apparatus in which the reflectance at the time of the white display is high and the good black display can be performed or the reflection type display apparatus in which the color display is demanded in addition to the white display and the black display. For example, the invention can be used for an advertisement apparatus, an image display apparatus for displaying photographs of a digital camera or the like, a message board, electronic paper, or the like. The invention can be also used for a reflection type display apparatus of a segment type such as a watch or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2008-210527, filed Aug. 19, 2008, and No. 2008-191049, filed Jul. 24, 2008 which are hereby incorporated by reference herein in their entirety.

What is claimed is:

1. A display apparatus using electroplating for modulating light, comprising:
   a first electrode;
   a second electrode;
   an electrolyte solution arranged between the first and second electrodes for forming an electroplating film on one of the first and second electrodes when a voltage is applied between the first and second electrodes; and
   a layer formed on the first electrode, the layer including an insulator having a gap therein, and conductive fine particles dispersed in the gap.

2. The display apparatus according to claim 1, wherein the insulator having the gap therein has a light transmitting property for visible light.

3. The display apparatus according to claim 2, wherein a refractive index of the insulator is equal to 2 or less.

4. The display apparatus according to claim 3, wherein the insulator is formed from silicon oxide, aluminum oxide, a mixture containing as a main component the silicon oxide or the aluminum oxide, glass, polymethyl methacrylate (PMMA), polystyrene, or silicone.

5. The display apparatus according to claim 1, wherein the insulator is formed from a stacked layer of insulative fine particles.

6. The display apparatus according to claim 5, wherein the insulative fine particles contain as main components silicon oxide, aluminum oxide, a mixture containing as a main component the silicon oxide or the aluminum oxide, glass, polymethyl methacrylate (PMMA), polystyrene, or silicone.

7. The display apparatus according to claim 5, wherein a mean diameter of a conductive fine particle is smaller than a mean diameter of an insulative fine particle.

8. The display apparatus according to claim 1, wherein a mean diameter of a conductive fine particle is smaller than 100 nm.

9. The display apparatus according to claim 1, wherein the conductive fine particles are fine particles of a metal oxide.

10. The display apparatus according to claim 9, wherein the fine particles of the metal oxide contain as main components indium oxide; zinc oxide; tin oxide; impurity doped any one of the indium oxide, the zinc oxide or the tin oxide; or a mixture of the indium oxide, the zinc oxide or the tin oxide.

11. The display apparatus according to claim 1, wherein a metal to be deposited by the electroplating is silver.

12. The display apparatus according to claim 1, wherein the first electrode has a light transmitting property, and a voltage is applied between the first and second electrodes for the electroplating on the first or second electrode.

13. The display apparatus according to claim 12, further comprising a third electrode, wherein
the second electrode has a light transmitting property, and
a voltage is applied between the third and first electrodes, or between the third and second electrodes, for the electroplating on the first or second electrode.

14. The display apparatus according to claim 13, wherein a color of the electroplating on the first electrode is different from a color of the electroplating on the second electrode.

15. The display apparatus according to claim 12, further comprising a reflection plate placed adjacent to the second electrode.

16. The display apparatus according to claim 12, further comprising a plurality of first switches arranged in a matrix,
the plurality of first switches connected to each of a plurality of second electrodes arranged in the matrix,
a plurality of second switches connected to a control electrode of each of the plurality of first switches, for controlling turning on or off of the plurality of first switches, and
the plurality of first switches and second switches are provided for each pixel formed by the first and second electrodes.

* * * * *